(12) United States Patent
Shioya

(10) Patent No.: US 6,493,011 B1
(45) Date of Patent: Dec. 10, 2002

(54) COLOR REGISTRATION DEVIATION CORRECTION METHOD AND IMAGE FORMING APPARATUS

(75) Inventor: Kohei Shioya, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/706,703

(22) Filed: Nov. 7, 2000

(30) Foreign Application Priority Data

Dec. 15, 1999 (JP) ............................................. 11-355801

(51) Int. Cl.[7] .............................................. G03G 15/01
(52) U.S. Cl. ....................................... 347/116; 347/249
(58) Field of Search ................................ 347/116, 234, 347/248, 249; 399/301

(56) References Cited

FOREIGN PATENT DOCUMENTS

| JP | 8-152833 | 6/1996 |
| JP | 11-301032 | * 11/1999 |
| JP | 2000-98810 | * 4/2000 |

* cited by examiner

*Primary Examiner*—Joan Pendegrass
(74) *Attorney, Agent, or Firm*—Morgan, Lewis & Bockius LLP

(57) ABSTRACT

In a color registration deviation correction method or an image forming apparatus, a pattern image is read out, a color registration deviation amount is detected, and a correction amount of the color registration deviation is calculated. On the basis of the calculated correction amount, it is judged whether correction can be made in an interimage period. In the case where the correction can be made in the interimage period, the color registration deviation correction is made in the interimage period, and in the case where the correction can not be made in the interimage period, the color registration deviation correction is made in the two interimage periods.

14 Claims, 19 Drawing Sheets

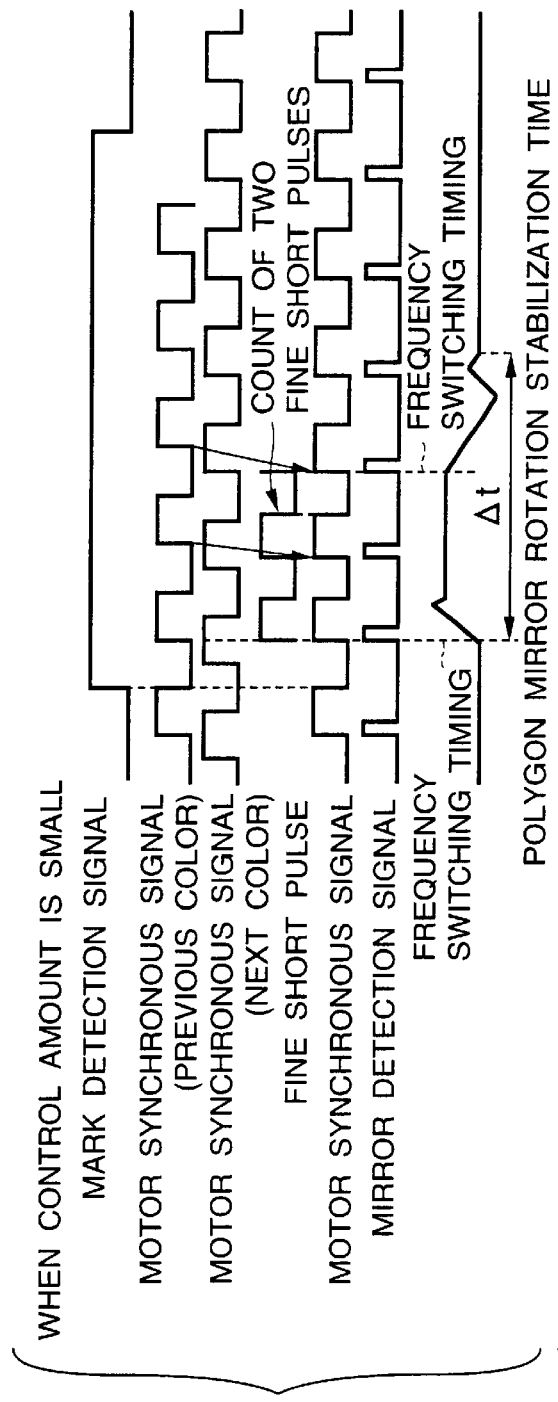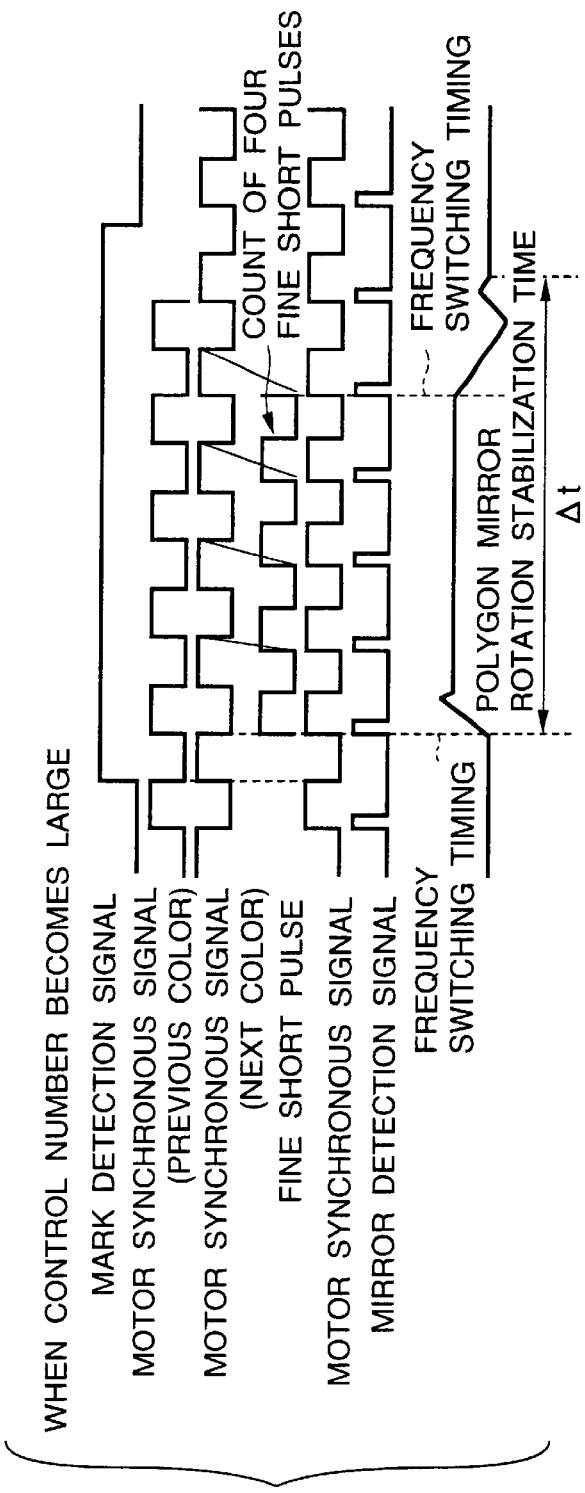

COLOR REGISTRATION DEVIATION CORRECTION METHOD AND IMAGE FORMING APPARATUS

BACKGROUND OF THE INVENTION

1. Field of the Invention

The present invention relates to a color registration deviation correction method for a laser beam printer, a digital copying machine, or the like in which a laser beam is scanned by an optical scanning device provided with a rotating polygon mirror and a multicolor image is formed by an electrophotography system, and an image forming apparatus, and particularly to a color registration deviation correction method having a function of correcting a color registration deviation as a position deviation between respective colors in a sub-scanning direction, and an image forming apparatus.

2. Description of the Related Art

In a multicolor image forming apparatus using an electrophotography system, toners of four colors of black (K), cyan (C), magenta (M), and yellow (Y) are superimposed on a sheet and are transferred, so that multicolor printing is performed. When multicolor printing is performed, if writing positions of the respective colors subtly deviate from each other, a color deviation appears when they are superimposed and transferred on the sheet, and printing quality is degraded. Then, in order to solve this and to obtain a multicolor print of high precision, it becomes necessary to perform writing position control for correcting the color registration deviation.

As a correction of the color registration deviation, there has been conventionally proposed a correction method in which a toner image of a specified pattern is formed on an intermediate transfer body or the like, the pattern is detected by an optical sensor including an optical source, a photodetector, and the like, a color registration deviation amount is calculated, data of a correction amount is transmitted to each correcting system, and correction is made, or a correction method in which a specified pattern is previously prepared in a region outside of an image formation region of an intermediate transfer body or the like, the pattern is detected by a sensor, a color registration deviation amount is calculated from the detection timing of the pattern and the detection timing of a writing timing signal (SOS signal) or the like in a main scanning direction, data of a correction amount is transmitted to each correcting system, and correction is made.

Among various kinds of corrections, especially in the case where writing position correction in a sub-scanning direction is made, high precision correction can be made by combining a section of correcting a writing position in a unit of one line and a section of correcting a writing position in a unit of less than one line. As shown in FIG. 12A, a print start signal (image forming signal) is made a trigger, a predetermined number of writing timing signals (SOS signals) in the main scanning direction is counted, and writing timings of the respective colors are made coincident with each other with high precision, so that images are superimposed. Here, if a normal writing timing is made (2) in FIG. 12A, when the count number of the SOS signals is increased or decreased ((1) and (2) in FIG. 12A), as shown in FIG. 12B, the writing position is moved up and down in a unit of one line. By using this, the writing timing can be controlled in a unit of one line, and writing position correction can be made.

As a method of correcting a writing position in a unit of less than one line, as shown in FIG. 13C, a rotation phase of a rotating polygon mirror (so-called polygon mirror) is changed so that the correction can be made. It is assumed that an output timing of a normal SOS signal is made (2) in FIG. 13A. When the rotation phase of the polygon mirror is changed ((1) and (2) in FIG. 13C), as shown in FIG. 13A, the generation timing of the SOS signal is changed in accordance with this ((1) and (2) in FIG. 13A), and as shown in FIG. 13B, the writing position in the sub-scanning direction is moved up and down. The rotary phase of the polygon mirror is controlled within the range where the movement of the writing position becomes less than one line, so that the correction can be made.

The polygon mirror is attached to a polygon mirror driving motor. As shown in FIG. 14A, PLL (Phase Locked Loop) control is performed by a motor (MOT) control circuit with a reference clock and a rotation frequency signal (FG output or hole element output in a polygon mirror driving motor, or scanning light position detector output by a photodetector arranged outside of a scan surface in an optical scanning device, which becomes a writing position timing signal in the main scanning direction) such as a SOS signal, so that the polygon mirror driving motor rotates at constant speed of rotation with high precision.

As shown in FIG. 14B, control of the polygon mirror rotation phase can be made by controlling the phase of the reference clock given to the polygon mirror driving motor for rotating the polygon mirror. That is, the phase of the reference clock is changed, so that a phase difference is generated between the rotation frequency signal and the reference clock, and the rotation speed of the polygon mirror driving motor is changed so as to remove this. With this, the rotation phase of the polygon mirror is also changed. Then, the rotation phase of the polygon mirror is changed, so that the output timing of the writing timing signal in the main scanning direction is also changed with this. Since the writing timing in the main scanning direction is kept constant in accordance with the writing timing signal in the main scanning direction, the writing timing in the sub-scanning direction can be controlled.

As such a correction technique of color registration deviation, especially as a correction technique of less than one line, there is a technique disclosed, for example, Japanese Patent Unexamined Publication No. Hei. 8-152833.

According to the technique disclosed in Japanese Patent Unexamined Publication No. Hei. 8-152833, in an apparatus which includes one image forming apparatus and in which a multicolor image is formed by superimposing plural toner images on an intermediate transfer body, a phase matching period in which a frequency of a reference clock given to a polygon mirror driving motor at the time of rotation phase control of a polygon mirror is made slightly low or high is provided, and the frequency is returned to the original one after the phase matching period corresponding to a control amount, so that the phase of a mirror surface of the polygon mirror is gradually delayed or advanced, and control is made to obtain a desired phase (see FIGS. 15A and 15B). By this, writing timing in the sub-scanning direction is controlled, and color registration position deviation in the sub-scanning direction is corrected, which is proposed in this publication.

Besides, there is also such a technique that in an apparatus in which a multicolor image is formed by plural image forming devices and by sheet conveyance at one time, plural master clocks as references of phase control are previously provided, and when a color registration deviation in a sub-scanning direction is detected, a clock corresponding to a correction amount is selected among the plural master clocks, and further, the frequency of the reference clock given to a polygon mirror driving motor is made slightly low or high, and the frequency is returned to the original one at the point of time when the reference clock and the master clock are coincident with each other, so that writing timing in the sub-scanning direction is controlled and the color registration deviation in the sub-scanning direction is corrected in less than one line (see FIGS. 14A, 14B, and 16A).

In recent years, in an image forming apparatus such as a digital copying machine or a laser beam printer, high speed and high resolution are demanded. Besides, as described above, the technique of color registration deviation correction is indispensable to a multicolor image forming apparatus to keep a high quality image. In order to keep the high quality image and make printing at high speed, a technique to control color registration during continuous printing without interruption of a print job becomes necessary.

This technique is such that a specified pattern of each color is formed of a toner image in a period (hereinafter referred to as an interimage period) between images formed on a primary transfer part such as an intermediate transfer body, the pattern is detected by an optical sensor including a light source, a photodetector, and the like, and a color registration deviation amount is calculated, so that correction is made in the inter image period different from pattern formation, or such that a detection timing of a specified pattern previously prepared in a region outside of an image formation region of an intermediate transfer body or the like and an output timing of a writing timing signal or the like in the main scanning direction are detected in a period of an each single color image formation interval, and writing timing in the sub-scanning direction is changed. The shorter the interimage period is, the faster the print performance of the apparatus becomes.

However, in the conventional multicolor image forming apparatus including plural image forming devices, if the interimage period during the print job in the continuous printing is made short, there occur problems as set forth below.

In Japanese Patent Unexamined Publication No. Hei. 8-152833 and in the technique of using the foregoing plural master clocks, the frequency is finely increased (here, an explanation will be made on a system in which the phase is advanced) by the structure as shown in FIGS. 15A and 14A to gradually change the phase, so that occurrence of rapid rotation change is prevented, and a time (stabilization time) when the polygon mirror returns to the original revolution speed can also be shortened. However, as a control amount becomes large, a control time becomes long, and as shown in FIGS. 15C and 16B, a time Δt (stabilization time) from the occurrence of the rotation change to the return to the original revolution speed becomes very long as compared with a frequency changing time.

For example, when the control amount is large (see FIG. 17), if printing is made on a next sheet before the rotation of the polygon mirror driving motor is stabilized, as shown in FIG. 17B, the influence of rotation variation appears on the image and becomes a color deviation to damage the print quality. Thus, it is necessary to convey the next sheet after a sufficient time has elapsed until the rotation of the polygon mirror driving motor becomes stable, so that the output capacity of the print image (speed of print processing) can not be raised.

Besides, when the change of the rotation phase of the polygon mirror is continuously carried out, there is a case where the phase of an SOS signal after each correction becomes equal to or more than the phase of an SOS signal before one line or after one line of the reference color. For example, as shown in FIGS. 18A to 18E, in the correction of FIGS. 18A to 18C, since the phase of the SOS signal after the correction does not exceed the phase of the SOS signal one line before the reference color, the correction can be made without any problem. However, as in FIGS. 18D to 18E, in the case where the phase of the SOS signal after correction exceeds the phase of the SOS signal one line before the reference color, there is a problem that the count start timing of the SOS signal with the print start signal as a trigger is deviated, and by this, the writing start timing in sub-scanning is also moved by one line, so that the color registration deviation of one line in sub-scanning appears on the sheet.

SUMMARY OF THE INVENTION

The present invention has been made in view of the above circumstances and provides a color registration deviation correction method and an image forming apparatus in which an image can be formed while a high quality image is kept and color registration can be controlled without interrupting image formation.

According to an aspect of the present invention, a color registration deviation correction method of an image forming apparatus which forms an image by light scanning of a rotating polygon mirror reflecting and deflecting light from a light source, includes the steps of detecting a color registration deviation; calculating, from the detected color registration deviation, a correction value for making a correction of the color registration deviation; and dividing the calculated correction value to make the color registration deviation correction plural times.

According to another aspect of the present invention, a color registration deviation correction method of an image forming apparatus which forms an image by light scanning of a rotating polygon mirror reflecting and deflecting light from a light source, includes a first step of detecting a color registration deviation and calculating, from the detected color registration deviation, a correction value for making a correction of the color registration deviation; a second step of judging, on the basis of the correction value calculated at the first step, whether a time needed to make the color registration deviation correction is longer than a predetermined period; and a third step of correcting the color registration deviation in the predetermined period when it is judged that the time is shorter than the predetermined period at the second step, and making the color registration deviation correction plural times when it is judged that the time is longer than the predetermined period at the second step.

According to the above invention, in the first step, the color registration deviation is detected, and the correction value for making the correction of the color registration deviation is calculated. In the second step, on the basis of the correction value calculated at the first step, it is judged whether the time needed to make the color registration deviation correction is longer than the predetermined period.

In the third step, the color registration deviation correction is completed in the predetermined period when it is judged that the time need to make the color registration deviation correction is shorter than the predetermined period at the second step, and the color registration deviation correction is divided and is made plural times when it is judged that the time need to make the color registration deviation correction is longer than the predetermined period at the second step. That is, in the case where the correction of the color registration deviation amount is not completed in the predetermined period, the color registration deviation correction is made plural times, for example, twice. Thus, it is possible to prevent such a case that the color registration deviation correction overlaps with the time of image formation so that a bad influence is exerted on the image, and it is possible to certainly correct the color registration deviation.

Accordingly, the image can be formed while the high quality image is kept, and the color registration can be controlled without interrupting the image formation.

According to another aspect of the present invention, an image forming apparatus which forms an image by light scanning of a rotating polygon mirror reflecting and deflecting light from a light source, includes a detection unit which detect a color registration deviation; a calculation unit which, from the color registration deviation detected by the detection unit, calculates a correction value for correcting the color registration deviation; and a control unit which divides the correction value calculated by the calculation unit and causes the color registration deviation correction to be made plural times.

According to another aspect of the present invention, an image forming apparatus which forms an image by light scanning of a rotating polygon mirror reflecting and deflecting light from a light source, includes a detection unit which detects a color registration deviation; a calculation unit which calculates, from the color registration deviation detected by the detection unit, a correction value for correcting the color registration deviation; and a control unit which causes the color registration deviation to be corrected in a predetermined period when a time need to make a correction of the color registration deviation on the basis of the correction value calculated by the calculation unit is shorter than the predetermined period, and causes the color registration deviation correction to be made plural times when the time is longer than the predetermined period.

According to the above invention, the detection unit detects the color registration deviation, and the calculation unit calculates, from the detected color registration deviation, the correction value for correcting the color registration deviation. The control unit causes the color registration deviation to be corrected in the predetermined period when the time need to make the correction of the color registration deviation on the basis of the correction value calculated by the calculation unit is shorter than the predetermined period (for example, the period between image formation and image formation, or the like), and causes the color registration deviation correction to be made plural times when the time need to make the correction of the color registration deviation is longer than the predetermined period. That is, in the case where the color registration deviation amount is not corrected in the predetermined period such as the period between the image formation and the image formation, the color registration deviation correction is made plural times. Thus, the color registration deviation can be certainly corrected without exerting a bad influence to the image.

Accordingly, the image can be formed at high speed while the high quality image is kept, and the color registration can be controlled without interrupting the image formation.

Incidentally, the plural corrections can be determined in accordance with the color registration deviation amount which can be corrected in the predetermined period.

BRIEF DESCRIPTION OF THE DRAWINGS

Preferred embodiments of the present invention will be described in detail based on the following figures, wherein:

FIG. 15B is a view showing an example of the rotation phase control when a control amount is small;

FIG. 15C is a view showing an example of the rotation phase control when the control amount is large;

DETAILED DESCRIPTION OF THE PREFERRED EMBODIMENTS

An embodiment of the present invention will be described below in detail with reference to the drawings.

Figure 1:
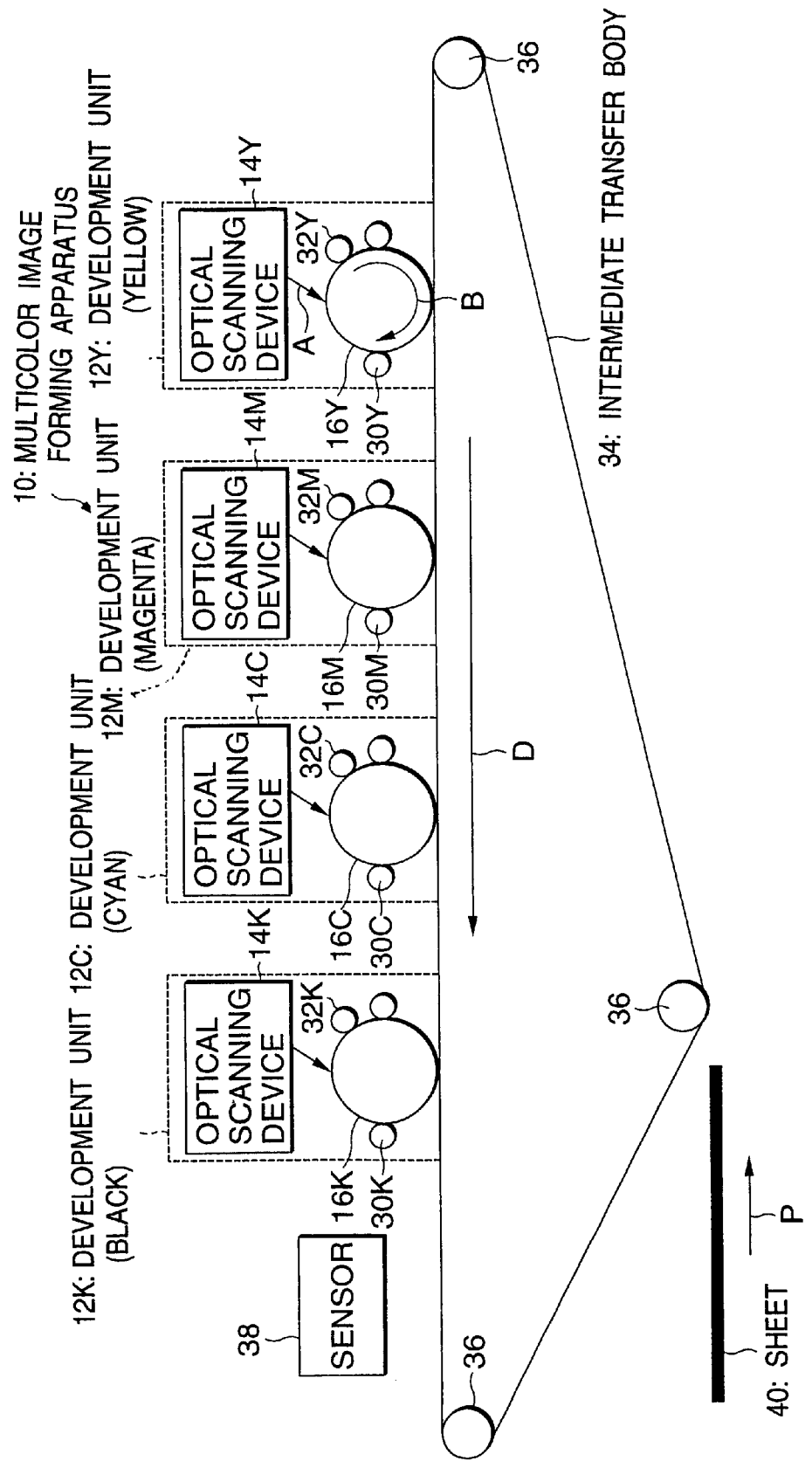
FIG. 1 is a schematic structural view of a multicolor image forming apparatus of an embodiment of the present invention.

FIG. 1 shows a schematic structure of a multicolor image forming apparatus to which the present invention is applied. As shown in FIG. 1, in a multicolor image forming apparatus 10, development units 12Y, 12M, 12C and 12K for forming images of respective colors of yellow (Y), magenta (M), cyan (C) and black (K) are arranged side by side (successively from the right to the left in FIG. 1).

Since these development units 12Y, 12M, 12C and 12K have the same structure, here, only the development unit 12Y will be described, and a description of the other development units 12M, 12C and 12K will be omitted. The same member in the development unit 12M, 12C or 12K as the member in the development unit 12Y is designated by a reference character in which the last English letter Y of the reference character given to the member in the development unit 12Y is replaced by an English letter indicating each color and will be described.

The development unit 12Y includes an optical scanning device 14Y for irradiating a light beam based on yellow image data in the direction of arrow A of FIG. 1, and a cylindrical photoreceptor 16Y rotating at constant speed in the direction of arrow B of FIG. 1.

Figure 2:
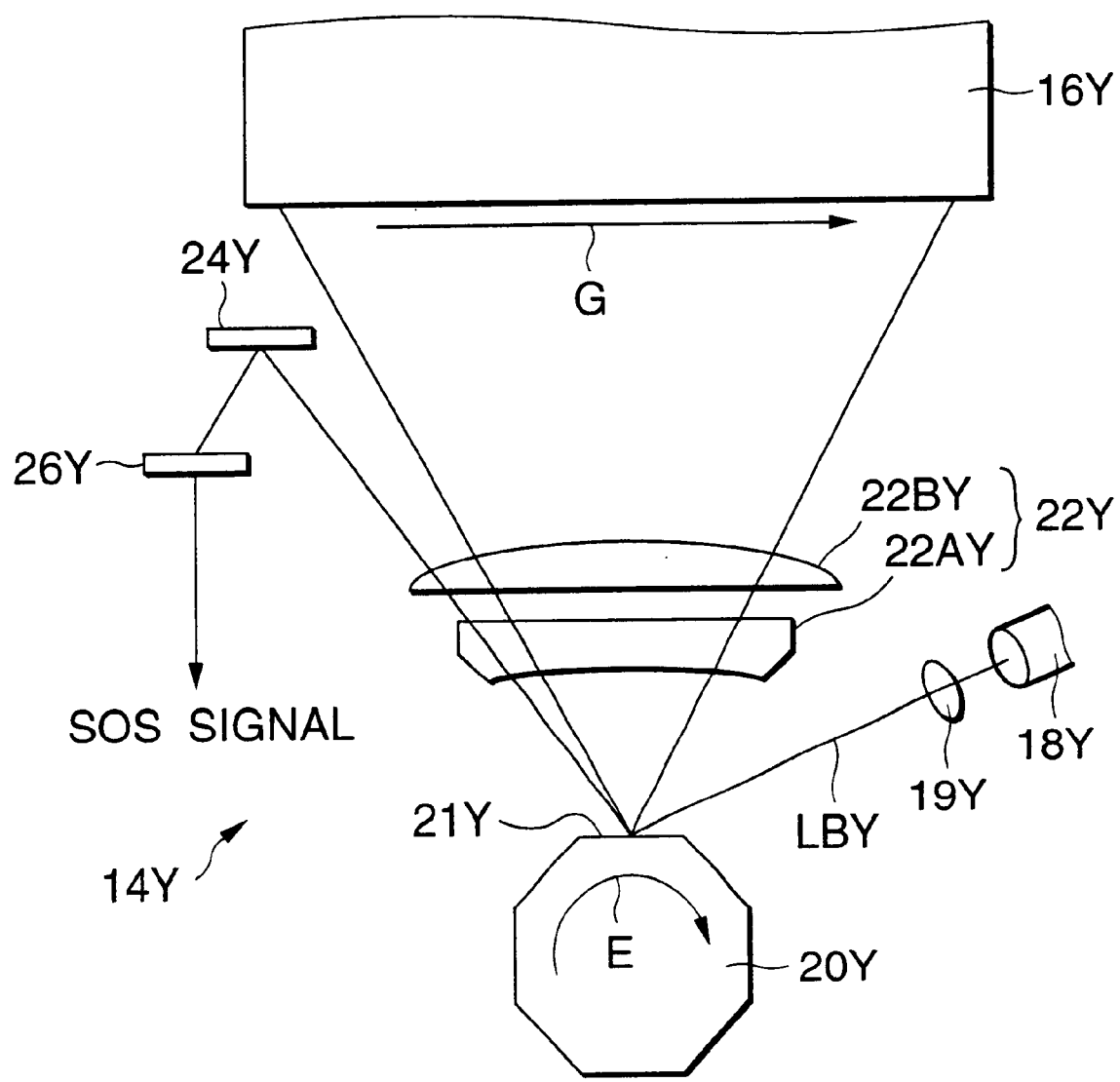
FIG. 2 is a schematic structural view of an optical scanning device in the multicolor image forming apparatus of the embodiment of the present invention.

FIG. 2 shows a detailed structure of the optical scanning device 14Y.

The optical scanning device 14Y includes a laser light source (hereinafter referred to as an LD) 18Y, and a rotating polygon mirror (hereinafter referred to as a polygon mirror) 20Y for reflecting an optical beam LBY emitted from the LD 18Y to irradiate the light beam to the photoreceptor 16Y.

The light beam LBY modulated on the basis of yellow (Y) image data is emitted from the LD 18Y. A collimator lens 19Y is disposed at a downstream side in the travelling direction of the light beam LBY. The collimator lens 19Y converts the light beam emitted from the LD 18Y so that a diffused light beam becomes a parallel light beam. The light beam LBY converted into the parallel light beam by the collimator lens 19Y is made incident on the polygon mirror 20Y through a not-shown cylinder lens.

The polygon mirror 20Y is shaped into a regular polygon (in this embodiment, a regular octagon as shown in FIG. 2) where plural reflecting surfaces 21Y are provided on its side, and is constructed so that the incident light beam LBY is converged on the reflecting surface 21Y.

The polygon mirror 20Y is fixed to a rotary shaft of an after-mentioned rotating polygon mirror driving motor (hereinafter referred to as a polygon mirror driving motor) 100Y, and is rotated at a predetermined speed in the direction of arrow E of FIG. 2 by rotation of the polygon mirror driving motor 100Y.

By the rotation of this polygon mirror 20Y, an incident angle of the light beam LBY to the respective reflecting surfaces 21Y is continuously changed so that it is deflected. By this, the light beam LBY is scanned on the photoreceptor 16Y in its axial direction (direction of arrow G in FIG. 2).

An fθ lens 22Y constituted by a first lens 22AY and a second lens 22BY is disposed in the travelling direction of the light beam LBY reflected by the polygon mirror 20Y. By this fθ lens 22Y, a scanning speed at the time of scanning the light beam LBY on the photoreceptor 16Y becomes a constant speed, and an image formation point is formed on the peripheral surface of the photoreceptor 16Y.

The light beam LBY transmitted through the fθ lens 22Y is bent by a not-shown reflecting mirror and is irradiated to the photoreceptor 16Y. A mirror 24Y is disposed in the travelling direction of the light beam LBY and in the leftmost end direction of the photoreceptor 16Y shown in FIG. 2, and the light beam LBY travelling in the leftmost end direction of the photoreceptor 16Y is reflected by the mirror 24Y.

A start of scan sensor (hereinafter referred to as an SOS sensor) 26Y for detecting a start of scan position is disposed in the reflection direction of the light beam LBY reflected by the mirror 24Y. The light beam LBY travelling in the leftmost end direction of the photoreceptor 16Y is incident on the SOS sensor 26Y every time the photoreceptor 16Y is scanned in the axial direction. That is, the SOS sensor 26Y can detect a start timing of scan for each line made by the optical scanning device 14Y to the photoreceptor 16Y. An SOS signal indicating the scan start timing for each line is outputted from the SOS sensor 26Y.

On the other hand, as shown in FIG. 1, a charging part 30Y is disposed at the upstream side of the irradiation position (see arrow A of FIG. 1) of the light beam LBY by the optical scanning device 14Y in the rotation direction (see the arrow B of FIG. 1) of the photoreceptor 16Y, and uniformly charges the photoreceptor 16Y. The photoreceptor 16Y uniformly charged by the charging unit 30Y is rotated in the direction of arrow B of FIG. 1 so that sub-scanning of the light beam LBY is made, and a latent image is formed on the photoreceptor 16Y.

A developing part 32Y for supplying yellow toner to the photoreceptor 16Y is disposed at the downstream side of the irradiation position of the light beam LBY by the optical scanning device 14Y in the rotation direction of the photoreceptor 16Y and opposite to the peripheral surface of the photoreceptor 16Y. The toner supplied from the developing part 32Y is stuck to the portion which is irradiated with the light beam LBY by the optical scanning device 14Y. By this, a yellow toner image is formed on the photoreceptor 16Y.

In the developing units 12M, 12C, and 12K, magenta, cyan and black toner images are formed on the photoreceptors 16M, 16C and 16K, respectively.

An endless belt-like intermediate transfer body 34 is disposed at the downstream side (position under the shaft core of the photoreceptor 16Y, 16M, 16C or 16K) of the located position of the developing part 32Y, 32M, 32C or 32K in the rotation direction of the photoreceptor 16Y, 16M, 16C or 16K.

This intermediate transfer body 34 is extended on plural winding rollers 36, and is conveyed in the direction of arrow D of FIG. 1. By this conveyance, the intermediate transfer body 34 is guided in order of the photoreceptors 16Y, 16M, 16C and 16K, and the yellow, magenta, cyan and black toner images are sequentially superimposed, so that a multicolor toner image is formed on the surface of the intermediate transfer body 34.

That is, all single color images of yellow, magenta, cyan, and black developed by the respective photoreceptors 16Y, 16M, 16C and 16K are superimposed and transferred by one passage of the intermediate transfer body 34, so that the multicolor toner image is formed. Thereafter, the image is collectively transferred onto a recording sheet 40 conveyed in the direction of arrow P of FIG. 1 from a not-shown tray one by one, so that the multicolor image is formed on the recording sheet 40.

Incidentally, each of the photoreceptors 16Y, 16M, 16C and 16K after transfer of the toner images onto the intermediate transfer body 34 is processed so that the toner remaining on the surface is removed by a not-shown photoreceptor cleaner. Besides, a not-shown intermediate transfer body cleaner is also disposed for the intermediate transfer body 34 after the multicolor toner image is transferred onto the recording sheet 40, so that the toner remaining on the surface of the intermediate transfer body 34 is removed. Incidentally, the remaining toner to be removed includes also the pattern image formed for color registration deviation detection.

A sensor 38 constituted by a light source and an optical sensor such as a photodetector is disposed at the downstream side of the located position of the developing unit 12K in the conveyance direction of the intermediate transfer body 34. This sensor 38 reads the pattern image formed on the intermediate transfer body 34. On the basis of the read result, the sensor 38 sends this electrical output to a color registration control unit 124 shown in FIG. 3 in order to control rotation of polygon mirror driving motors 100Y, 100M, 100C and 100K for rotating the polygon mirrors 20Y, 20M, 20C and 20K.

Figure 3:
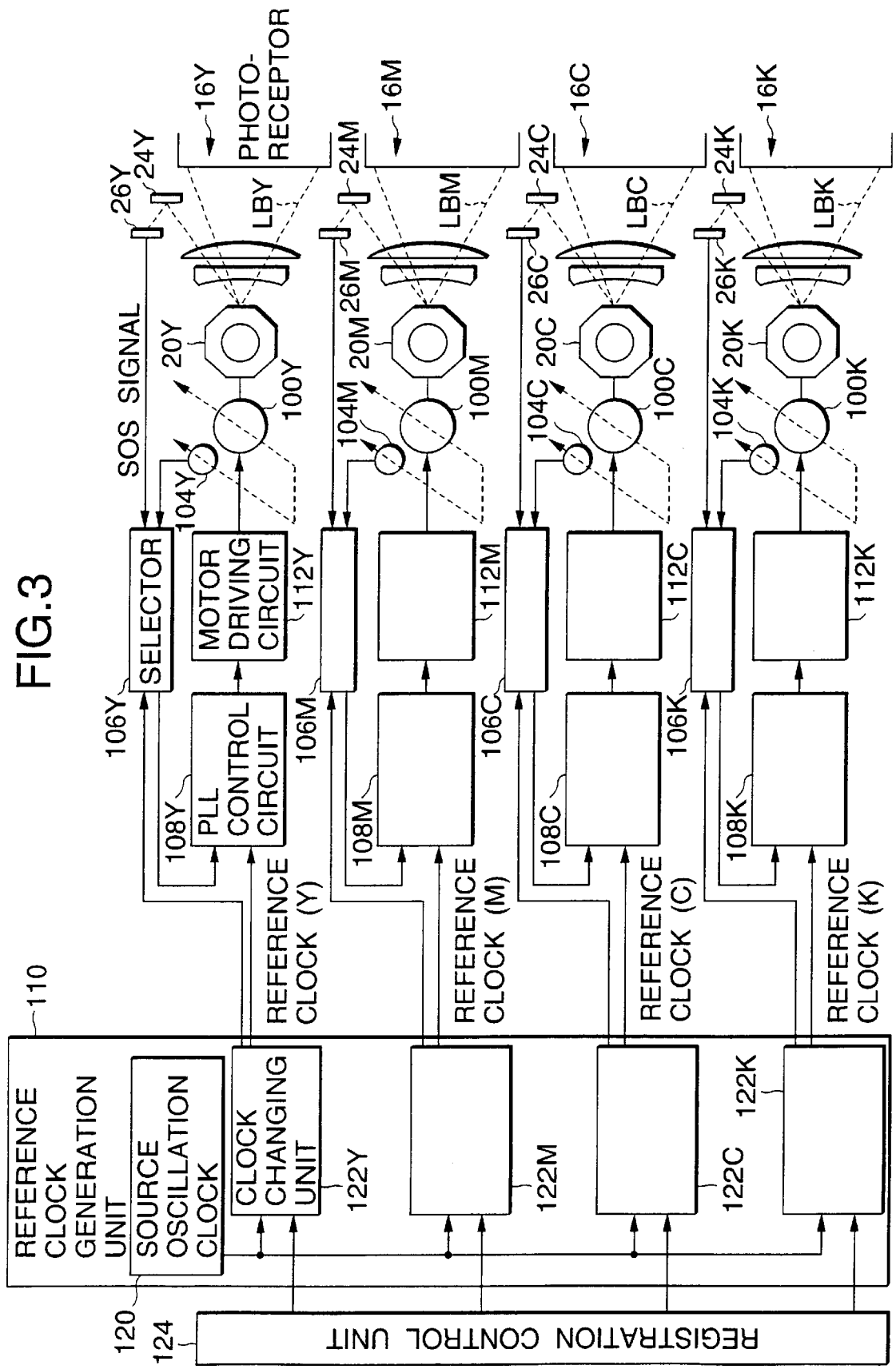
FIG. 3 is a block diagram showing a control system of the multicolor image forming apparatus of the embodiment of the present invention.

Subsequently, a control system of the multicolor image forming apparatus 10 to which the foregoing optical scanning devices 14Y, 14M, 14C and 14K are connected will be described. FIG. 3 is a block diagram showing the control system of the multicolor image forming apparatus 10. Incidentally, since the optical scanning devices 14Y, 14M, 14C and 14K have the same structure, the optical scanning device 14Y will be described similarly to the above, and the description of the other devices will be omitted.

As shown in FIG. 3, a reference clock generation unit 110 uses a clock of a predetermined frequency oscillated from a source oscillation clock 120, changes the frequency of the reference clock by a clock changing unit 122Y provided correspondingly to each color, and outputs it to a PLL control circuit 108Y.

Figure 4A:
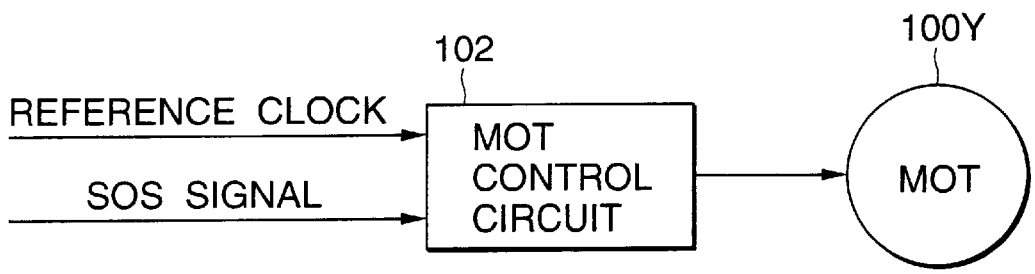
FIG. 4A is a block diagram for explaining rotation control of a rotating polygon mirror by PLL control.

As shown in FIG. 4A, the polygon mirror driving motor 100Y is connected to a motor control circuit 102. The motor control circuit 102 is constituted by a selector 106Y, a PLL control circuit 108Y, and a motor driving circuit 112Y, which are described later.

Besides, as shown in FIG. 3, an FG sensor 104Y is disposed at the polygon mirror driving motor 100Y, and a pulse signal (comparison clock) synchronous with the rotation speed of the polygon mirror driving motor 100Y is generated. This comparison clock is inputted to the selector 106Y. The SOS signal outputted from the SOS sensor 26Y is also inputted to this selector 106Y.

The selector 106Y is connected to the PLL control circuit 108Y, and is designed such that the SOS signal or the comparison clock is selectively outputted to the PLL control circuit 106Y.

Figure 4B:
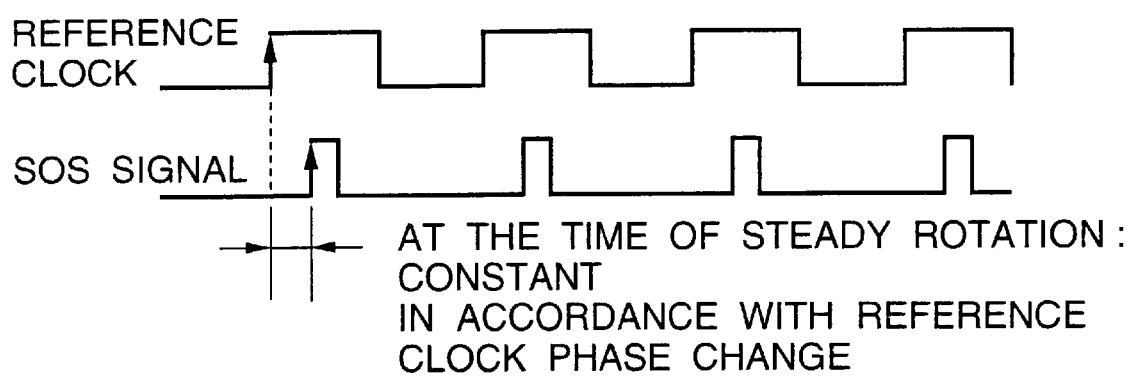
FIG. 4B is a view showing a phase difference between a reference clock and an SOS signal as a comparative clock by the PLL control.

The reference clock from the reference clock generation unit 110 is inputted to this PLL control circuit 106Y as described above. Besides, the PLL control circuit 108Y is connected to the motor driving circuit 112Y, and outputs a speed control signal for controlling a motor driving speed to the motor driving circuit 112Y. By this, the polygon mirror driving motor 100Y is always controlled at a suitable rotation speed and a suitable phase. That is, PLL control is made by the reference clock supplied from the reference clock generation unit 110 and the SOS signal from the SOS sensor 26Y, and the polygon mirror 20Y can be rotated at a constant speed and with high precision. At this time, as shown in FIG. 4B, the reference clock and the SOS signal are in a phase lock state at a predetermined phase difference.

The color registration control unit 124 receives detection output of the sensor 38, and calculates a correction amount in a unit of one line and a correction amount in a unit of less than one line. In the following description, correction in a unit of one line will be called a coarse adjustment, and correction in a unit of less than one line will be called a fine adjustment.

Figures 5A, 5B:
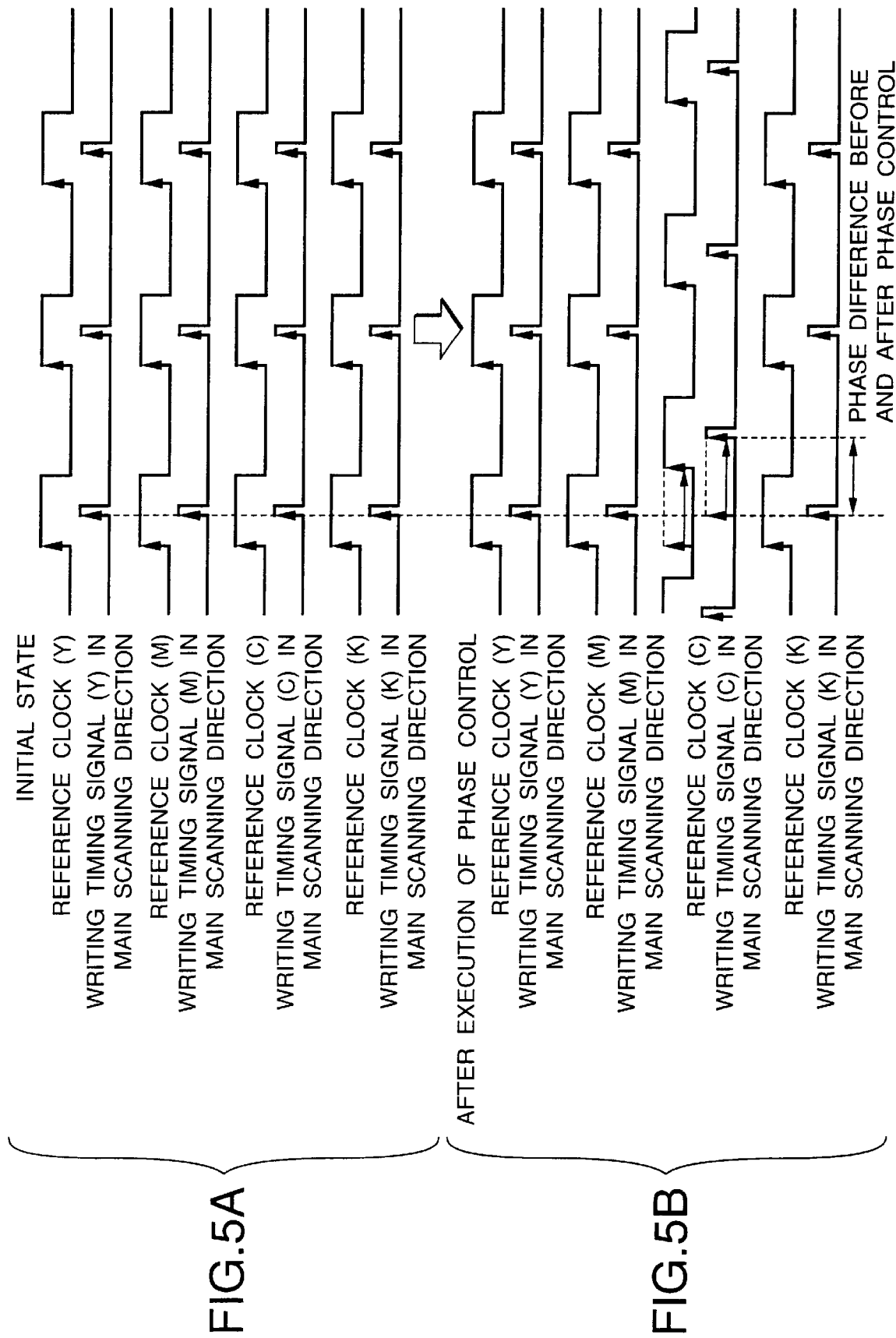
FIGS. 5A and 5B are views showing an example of a correction method of less than one line, FIG. 5A showing an initial state, and FIG. 5B showing a state after execution of the phase control.

When calculation of the correction amount is ended, a correction execution command of coarse adjustment is outputted to a not-shown writing timing control unit, a correction execution command of fine adjustment is outputted to the reference clock generation means 110, and a clock phase as an object of clock phase control is determined. Further, in order to control the phase of the reference clock of the polygon mirror driving motor 100Y, a division ratio of the source oscillation clock 120 is changed to change the frequency of the reference clock. By this, the reference clock phase of a correction object color with respect to the phase of the reference clock of the reference color is changed. The division ratio of the source oscillation clock is returned to the original at the point when the phase difference between the phase of the clock as the object of the phase control and the phase of the reference clock in which the frequency is changed becomes substantially zero, and the phase change is ended. By the frequency change of the reference clock, the rotation number of the polygon mirror driving motor 100Y is changed to the rotation number corresponding to the changed frequency, and is again returned. Then, control is made so that the SOS signal follows the change of the reference clock frequency. By this, since the polygon mirror rotation phase of the correction object color with respect to the polygon mirror rotation phase of the reference color is changed, as shown in FIGS. 5A and 5B, the phase of the main scan writing timing signal of the correction object color with respect to the phase of the main scan writing timing signal of the reference color is changed after correction, and the writing timing in the sub-scanning direction is changed.

Incidentally, in this embodiment, it is assumed that the minimum unit of the fine adjustment (writing position correction of less than one line) of the rotation phase control of the polygon mirror 20Y is 1/8 line part, and the writing position can be moved in the up direction (−direction) and the down direction (+direction) of the sheet by 7/8 line part at the maximum. Besides, it is assumed that a correction range in which a correction time falls within an interimage period (period between image regions written on the intermediate transfer body) is ±2/8 line part, and in the correction of more than that, a correction time does not fall within the interimage period.

Figure 6A:
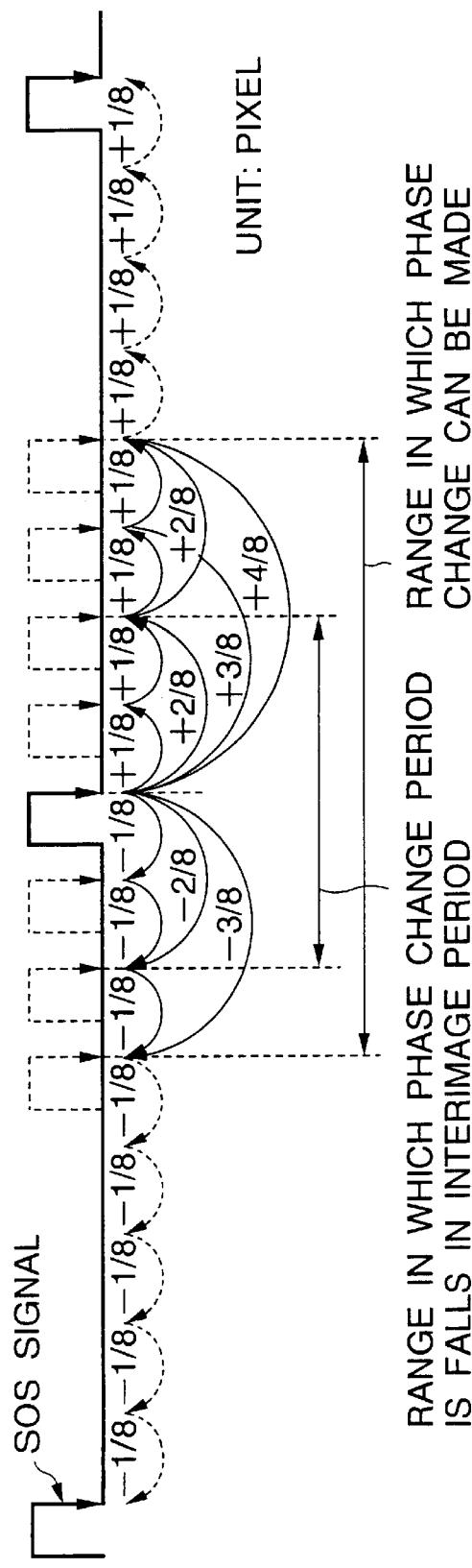
FIG. 6A is a view showing a rotation phase control range of a polygon mirror.

Besides, as shown in FIG. 6A, although even the range of ±7/8 line part can be used as the rotation phase control range of the polygon mirror, if the coarse adjustment and fine adjustment are combined, it is possible to correct all range by using the range of from −3/8 line part to +4/8 line part (the range of from 4/8 line part to +3/8 line part may be adopted). For example, in the case where a writing position correction amount of less than one line is +5/8 line part, if writing position is actually moved in the reverse direction by 3/8 line part, and further, the writing position is advanced, the correction becomes equal to the correction of writing position change of +5/8 line part. Besides, in the case where a writing position correction amount of less than one line is −4/8 line part, if the writing position is actually moved in the reverse direction by +4/8 line part, and further, the writing position is delayed by one line, the correction becomes equal to the correction of writing position change of −4/8 line part. Thus, in this embodiment, the rotation phase control of the polygon mirror 20Y can be made within the range of −3/8 line part to +4/8 line part.

Figure 6B:
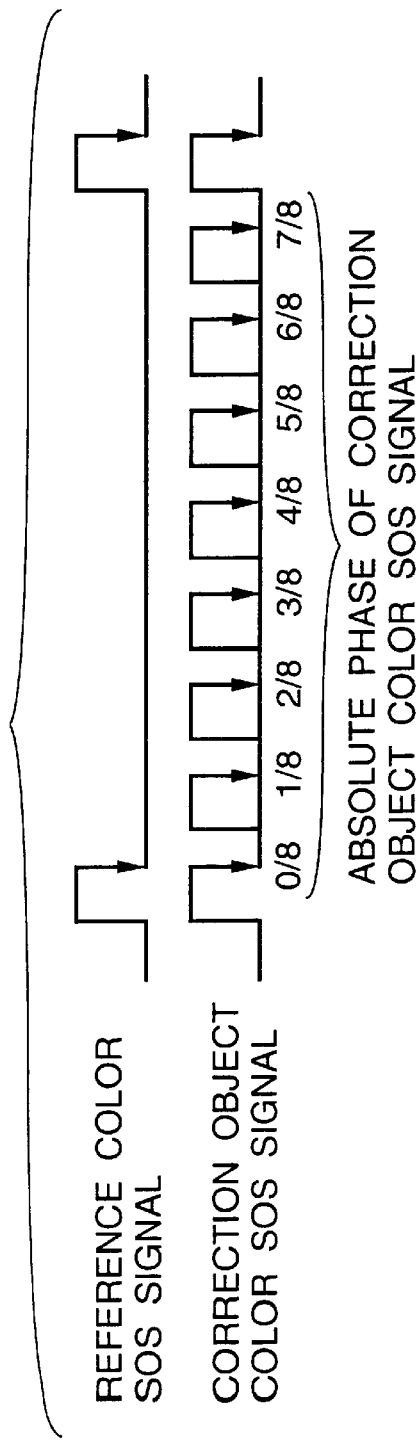
FIG. 6B is a view showing the absolute phase of the SOS signal of a correction object color to the SOS signal of a reference color.
Figure 7:
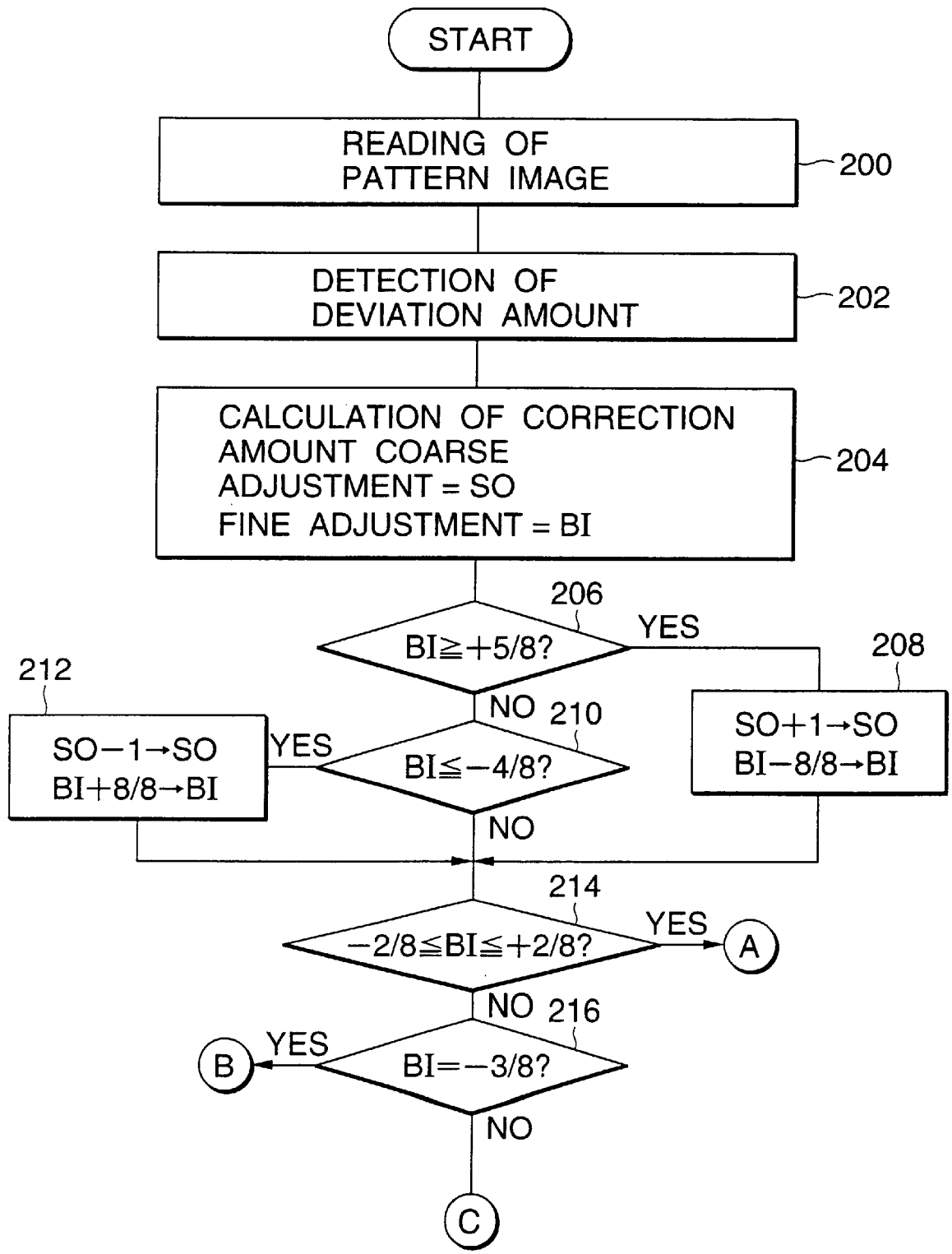
FIG. 7 is a flowchart for explaining a color registration deviation correction of an embodiment of the present invention.

Incidentally, as shown in FIG. 6B, a phase (absolute phase) which the SOS signal of the correction object color should take with respect to the SOS signal of the reference color for color registration deviation correction is made 0/8 when the phase of the reference color is coincident with the phase of the correction object color, and subsequently, it is made equally 1/8 to 7/8.

Next, the operation of this embodiment will be described with reference to flowcharts of FIGS. 7 to 10.

At step 200, a specified pattern image formed on the intermediate transfer body 34 is detected by the sensor 38, and the detection result is outputted to the color registration control unit 124. At subsequent step 202, a color registration deviation amount of each color with respect to the reference color is detected.

At step 204, a coarse adjustment amount (SO) and a fine adjustment amount (BI) of each color in writing timing in the sub-scanning direction are calculated by the color registration control unit 124.

At step 206, it is judged whether the calculated fine adjustment amount (BI) is equal to or larger than +5/8 line part. In the case where the judgement is affirmative, the procedure proceeds to step 208, and a value obtained by adding 1 to the coarse adjustment amount (SO) is made the coarse adjustment amount (SO), a value obtained by subtracting 8/8 from the fine adjustment amount (BI) is made the fine adjustment amount (BI), and the procedure proceeds to step 214. That is, in the case where the fine adjustment amount is, for example, 5/8, it becomes (5/8)−(8/8)=−3/8 line part, and the rotation phase of the polygon mirror is adjusted in the reverse direction, so that 1 is added to the coarse adjustment amount.

In the case where the judgement at step 206 is negative, the procedure proceeds to step 210, and it is judged whether the fine adjustment amount (BI) is equal to or less than −4/8 line part. In the case where the judgement is affirmative, the procedure proceeds to step 212, a value obtained by subtracting 1 from the coarse adjustment amount (SO) is made the coarse adjustment amount (SO), a value obtained by adding 8/8 to the fine adjustment amount (BI) is made the fine adjustment amount (BI), and the procedure proceeds to step 214. That is, in the case where the fine adjustment amount is, for example, −4/8, it becomes (−4/8)+(8/8)=4/8 line part, and the rotation phase of the polygon mirror 20 is adjusted in the reverse direction, so that 1 is subtracted from the coarse adjustment amount.

By these calculations, even when the necessary fine adjustment amount is within the range of −7/8 line part to +7/8 line part, the range of from −3/8 line part to +4/8 line part is sufficient for the actual fine adjustment amount. Incidentally, Table 1 shows the calculation in the case where the fine adjustment amount is equal to or less than −4/8 line part and is equal to or larger than +5/8 line part.

TABLE 1

| fine adjustment | −7/8 | −6/8 | −5/8 | −4/8 | +5/8 | +6/8 | +7/8 |
|---|---|---|---|---|---|---|---|
| calculation | +8/8 | +8/8 | +8/8 | +8/8 | −8/8 | −8/8 | −8/8 |
| result | +1/8 | +2/8 | +3/8 | +4/8 | −3/8 | −2/8 | −1/8 |
| coarse adjustment | −1 | −1 | −1 | −1 | +1 | +1 | +1 |

In this way, when the fine adjustment amount is calculated to fall within the range of from −3/8 line part to +4/8 line part, subsequently, at step 214, it is judged whether the fine adjustment amount falls within the range of from −2/8 line part to +2/8 line part, that is, whether the correction time falls in the interimage period. In the case where the judgement is affirmative, one correction is sufficient, and the procedure proceeds to the flowchart A shown in FIG. 8.

In the case where the judgement at step 214 is negative, the procedure proceeds to step 216. That is, it is understood that the fine adjustment amount is −3/8 line part, +3/8 line part, or +4/8 line part. In this case, it becomes necessary to make corrections plural times (in the case of this embodiment, twice) without fail.

Next, at step 216, it is judged whether the fine adjustment amount is −3/8 line part. In the case where the judgement is affirmative, the procedure proceeds to the flowchart B shown in FIG. 9, and in the case where the judgement is negative, the procedure proceeds to the flowchart C shown in FIG. 10.

Figure 8:
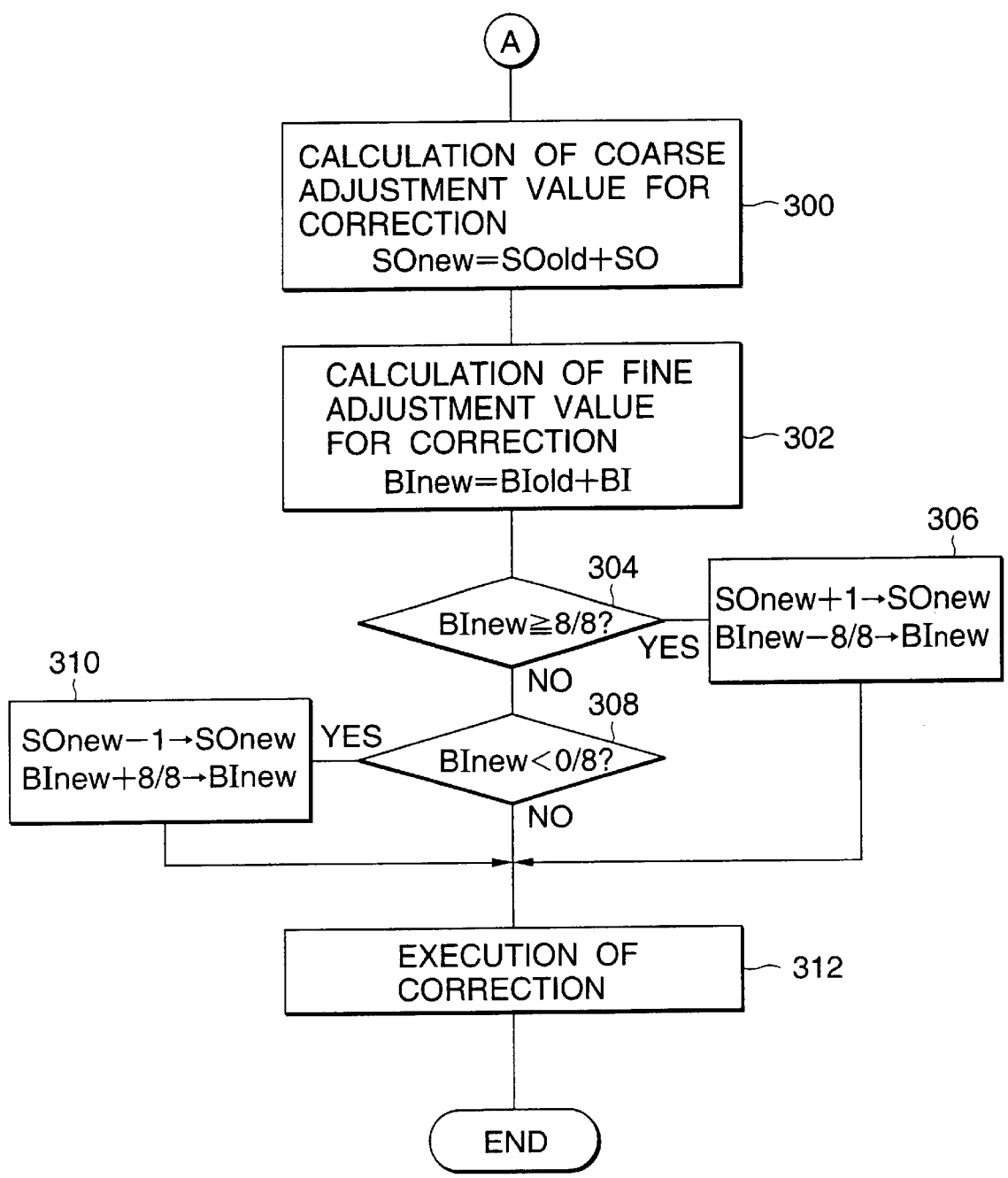
FIG. 8 is a flowchart showing a coupling point A of the flowchart for explaining the color registration deviation correction.

Next, the flowchart A shown in FIG. 8 will be described.

At step 300, a coarse adjustment value for correction (SOnew) is calculated. The coarse adjustment value for correction (SOnew) is calculated by adding a previous (correction made in a previous interimage period) coarse adjustment value for correction (SOold) and the coarse adjustment amount (SO). The coarse adjustment value for correction is calculated from a count value of the SOS signal from the SOS count start timing.

At step 302, similarly, a fine adjustment value for correction (BInew) is calculated. The fine adjustment value for correction (BInew) is calculated by adding a previous fine adjustment value for correction (BIold) and the fine adjustment amount (BI).

Subsequently, at step 304, it is judged whether the fine adjustment value for correction (sum of the absolute phase before calculation and the fine adjustment amount) calculated at step 302 is equal to or larger than 8/8. In the case where the judgement is affirmative, the procedure proceeds to step 306.

At step 306, a value obtained by adding 1 to the coarse adjustment value for correction (SOnew) is made the coarse adjustment value for correction (SOnew), a value obtained by subtracting 8/8 from the fine adjustment value for correction (BInew) as the absolute phase after the calculation is made the fine adjustment value for correction (NInew), and the procedure proceeds to step 312. That is, according to the correction made in the previous interimage period, there is a case where the count start timing of the SOS signal with the image start signal as the trigger is deviated by the correction of the next interimage period. Thus, on the basis of the correction value made in the previous interimage period, the coarse adjustment value for correction and the fine adjustment value for correction are again corrected. Accordingly, it is possible to prevent write deviation from occurring by the change of the count start timing of the SOS signal with the image start signal as the trigger.

In the case where the judgement of step 304 is negative, the procedure proceeds to step 308, and it is judged whether the fine adjustment value for correction (BInew) calculated at step 302 is smaller than 0/8. In the case where the judgement is affirmative, the procedure proceeds to step 310.

At step 310, a value obtained by subtracting 1 from the fine adjustment value for correction (SOnew) is made the fine adjustment value for correction (SOnew), a value obtained by adding 8/8 to the fine adjustment value for correction (BInew) as the absolute phase after the calculation is made the fine adjustment value for correction (BInew), and the procedure proceeds to step 312. That is, similarly to step 306, it is possible to prevent write deviation from occurring by the change of the count start timing of the SOS signal with the image start signal as the trigger.

On the other hand, in the case where the judgement at step 308 is negative, the procedure proceeds to step 312.

At step 312, the correction is executed, and a series of processings are ended. Table 2 shows the calculation of the coarse adjustment value for correction and the fine adjustment value for correction in the case where the fine adjustment amount is within the range of from −2/8 line part to +2/8 line part.

only −2/8 line part is corrected among the fine adjustment amount −3/8 line part.

Subsequently, at step 404, it is judged whether the fine adjustment value for correction (sum of the absolute phase before the calculation and the fine adjustment amount) calculated at step 402 is equal to or larger than 8/8. In the case where the judgement is affirmative, the procedure proceeds to step 406.

At step 406, a value obtained by adding 1 to the coarse adjustment value for correction is made the coarse adjustment value for correction (SOnew1), a value obtained by subtracting 8/8 from the fine adjustment value for correction (BInew1) as the absolute phase after the calculation is made the fine adjustment value for correction (BInew1), and the procedure proceeds to step 412. That is, according to the correction made in the previous interimage period, there is a case where the count start timing of the SOS signal with the image start signal as the trigger is deviated by the correction in the next interimage period. Thus, the coarse adjustment value for correction and the fine adjustment value for correction are again corrected on the basis of the value of the correction made in the previous interimage period. Accordingly, it is possible to prevent write deviation of one line part from occurring by the change of the count start timing of the SOS signal with the image start signal as the trigger.

TABLE 2

| | fine adjustment amount | | | | | | | | | | | | | | |
|---|---|---|---|---|---|---|---|---|---|---|---|---|---|---|---|
| | −2/8 | | | −1/8 | | | 0/8 | | | +1/8 | | | +2/8 | | |
| Calculation result | absolute phase before calculation −2/8 | | | absolute phase before calculation −1/8 | | | absolute phase before calculation (no change) | | | absolute phase before calculation +1/8 | | | absolute phase before calculation +2/8 | | |
| | when it is not smaller than 8/8 | when it is smaller than 0/8 | the rest | when it is not smaller than 8/8 | when it is smaller than 0/8 | the rest | when it is not smaller than 8/8 | when it is smaller than 0/8 | the rest | when it is not smaller than 8/8 | when it is smaller than 0/8 | the rest | when it is not smaller than 8/8 | when it is smalle than 0/8 | the rest |
| fine adjustment recalculation | −8/8 | +8/8 | — | −8/8 | +8/8 | — | — | — | — | −8/8 | +8/8 | — | −8/8 | +8/8 | — |
| coarse adjustment change value | +1 | −1 | 0 | −1 | −1 | 0 | — | — | — | +1 | −1 | 0 | +1 | −1 | 0 |

Figure 11A:
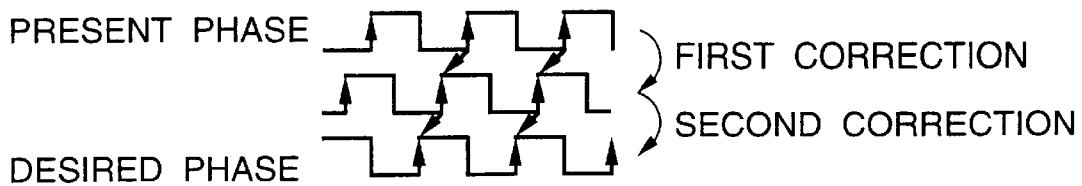
FIGS. 11A and 11B are views showing an example of timing when the color registration deviation correction is carried out, FIG. 11A showing an example of phase control, and FIG. 11B showing an example of timing when the correction is carried out.
Figure 11B:
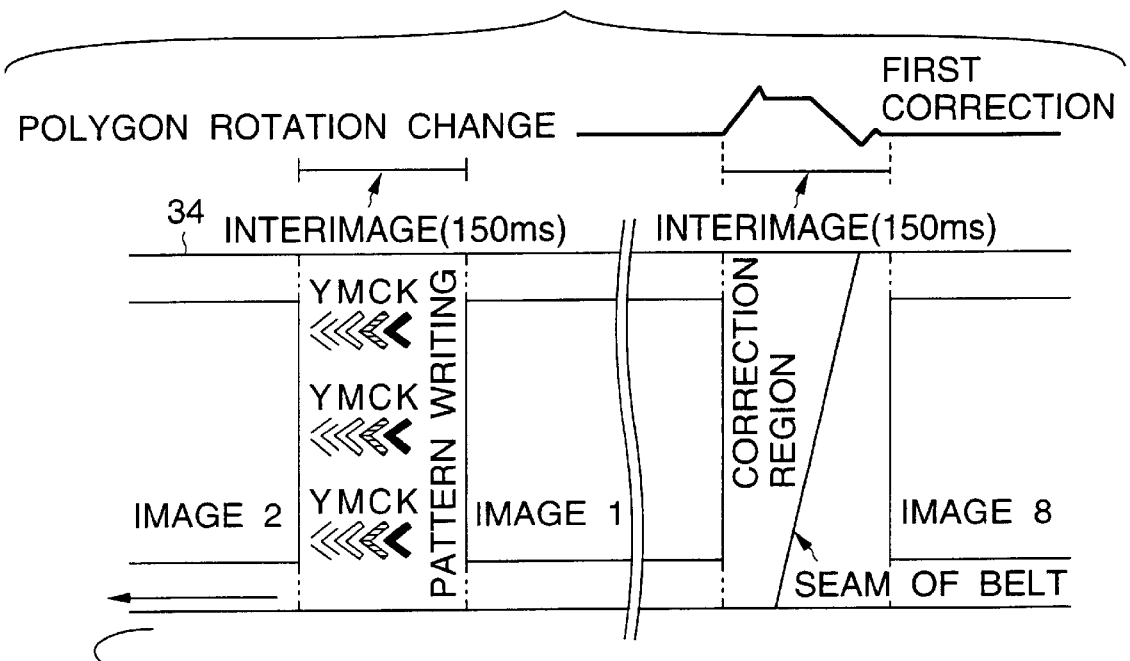
Figure 11B:
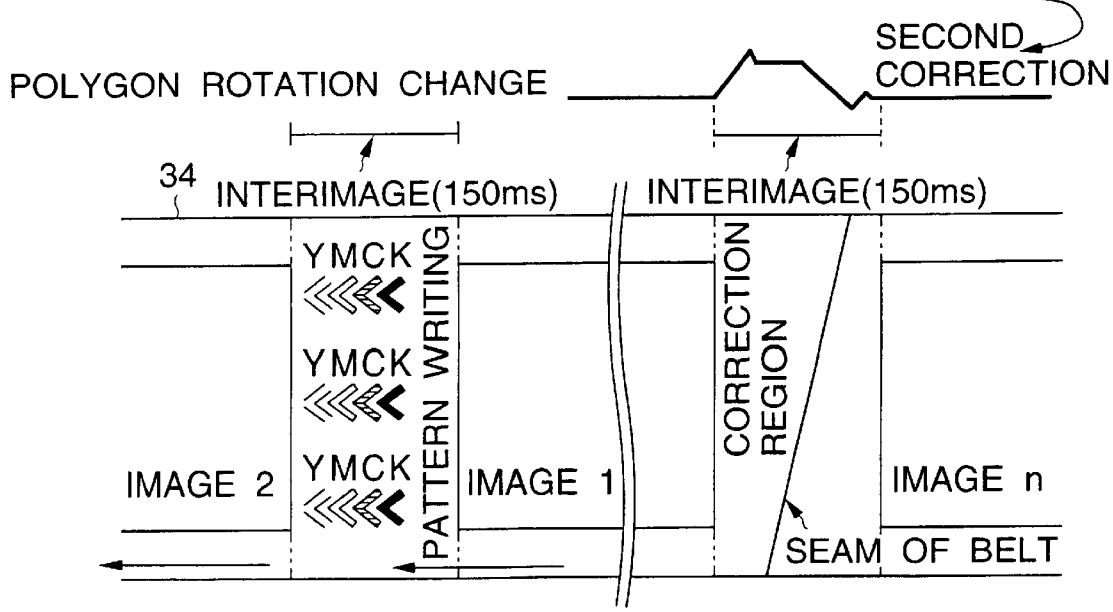
Figure 12B:
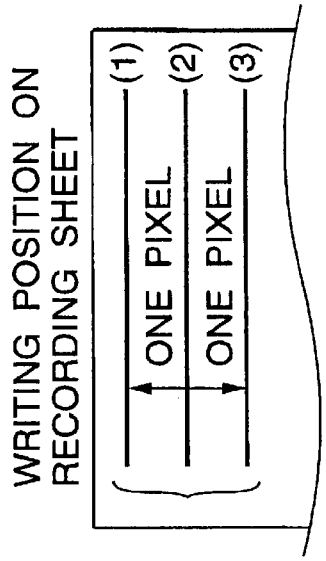
FIGS. 12A and 12B are views for explaining writing position control in a unit of one line in writing position control in a sub-scanning direction, FIG. 12A showing a writing timing, and FIG. 12B showing a writing position on a recording sheet.
Figure 12A:
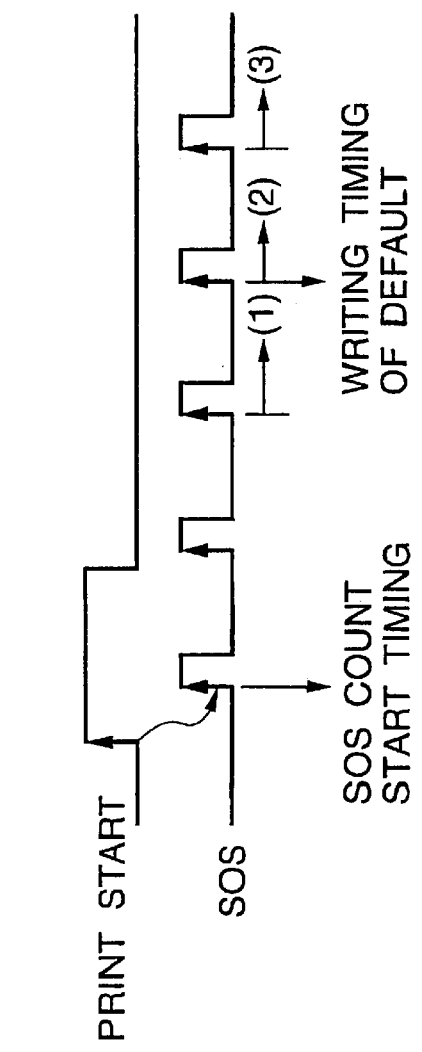
Figure 13B:
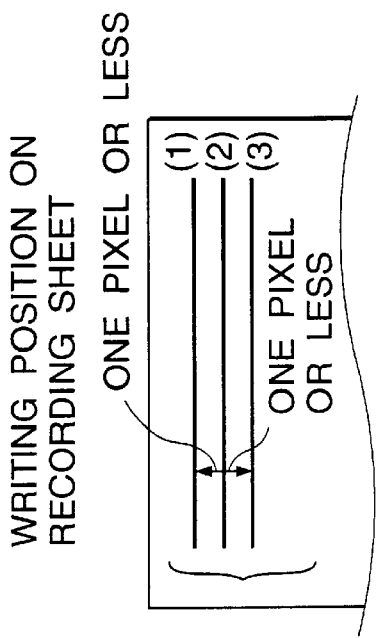
FIGS. 13A, 13B and 13C are views for explaining writing position control in a unit of less than one line in the writing position control in the sub-scanning direction, FIG. 13A showing a writing timing, FIG. 13B showing a writing position on a recording sheet, and FIG. 13C showing a reflecting surface of a polygon mirror.
Figure 13A:
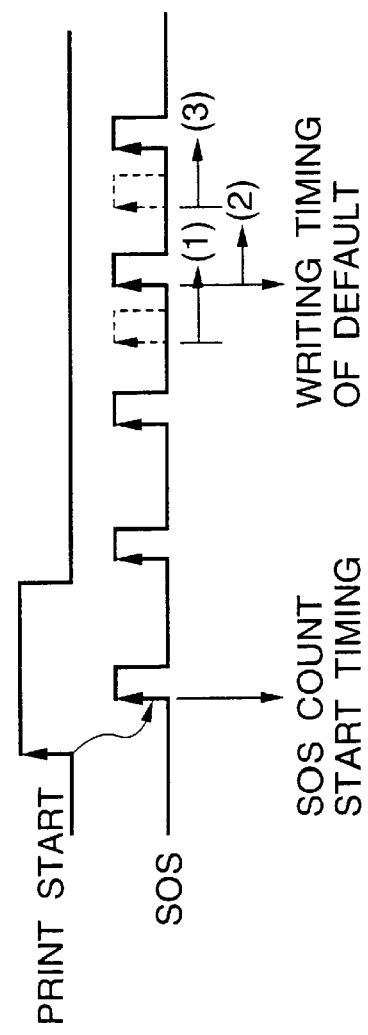
Figure 13C:
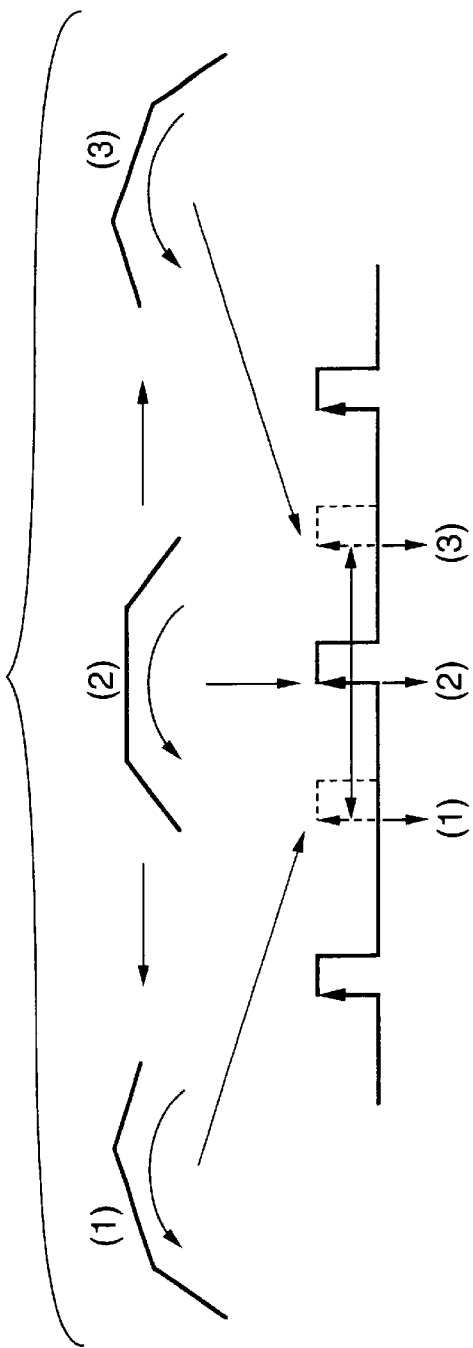
Figure 14B:
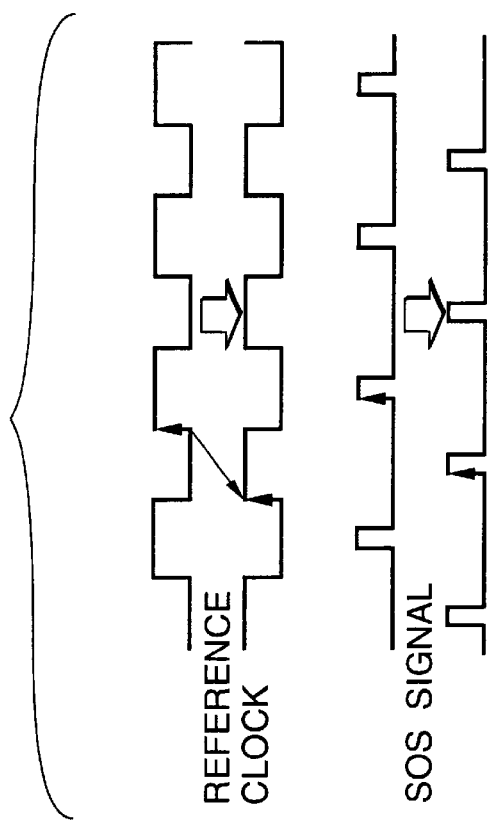
FIG. 14B is a schematic view showing the writing position control of sub-scanning.
Figure 14A:
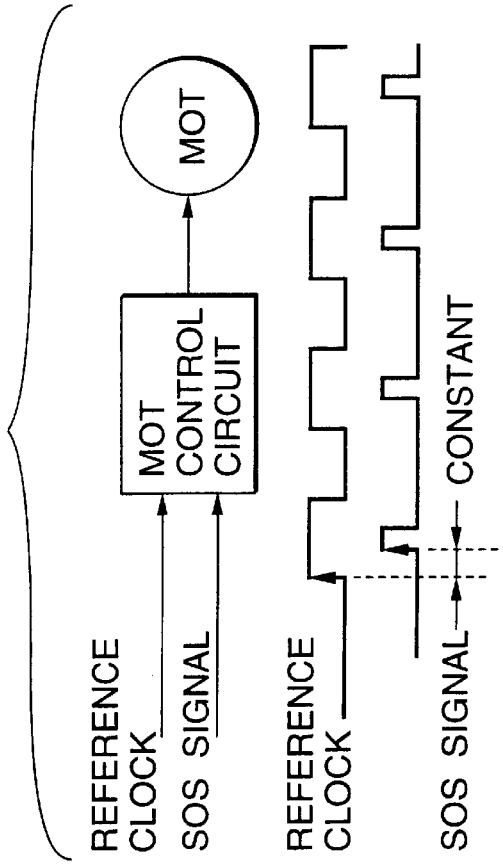
FIG. 14A is a view showing a schematic structure for controlling a polygon mirror driving motor in the writing position control of sub-scanning.
Figure 15A:
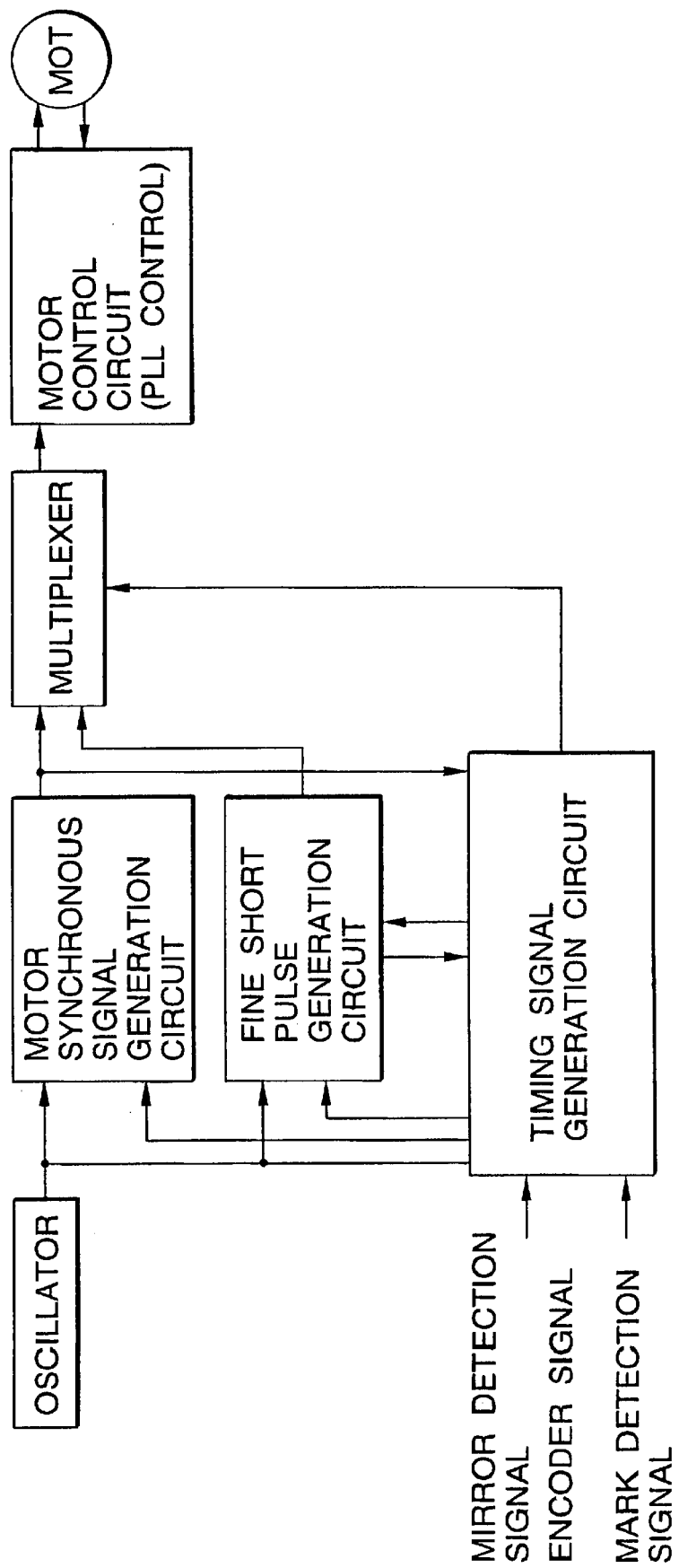
FIG. 15A s a block diagram showing a schematic structure of a conventional control system for controlling a writing position in the sub-scanning direction by controlling a rotation phase of a polygon mirror.
Figure 16A:
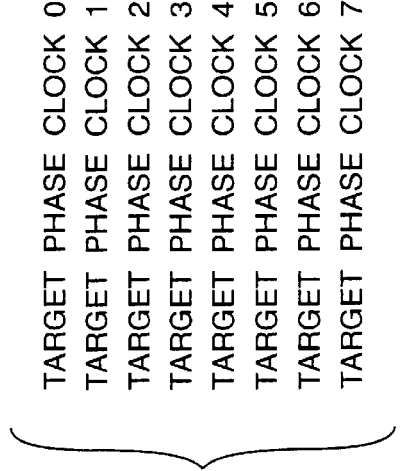
FIG. 16A is a view for explaining the rotation phase control of a polygon mirror for performing writing position control in the sub-scanning direction in another conventional control system.
Figure 16B:
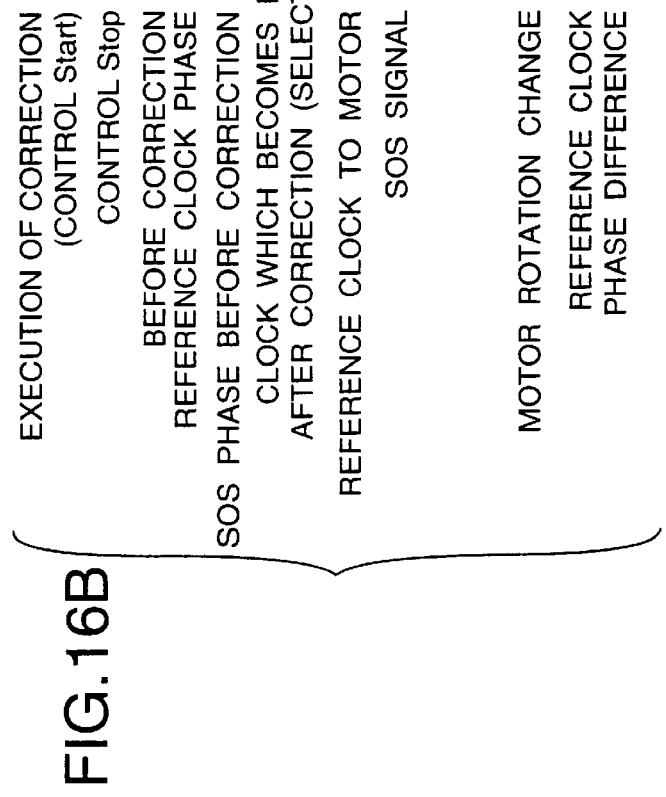
FIG. 16B is a view showing an example of the rotation phase control.
Figure 17A:
FIGS. 17A and 17B are views for explaining conventional problems, FIG. 17A showing a control system, and FIG. 17B being a view for explaining the influence of rotation change of a polygon mirror.
Figure 17B:
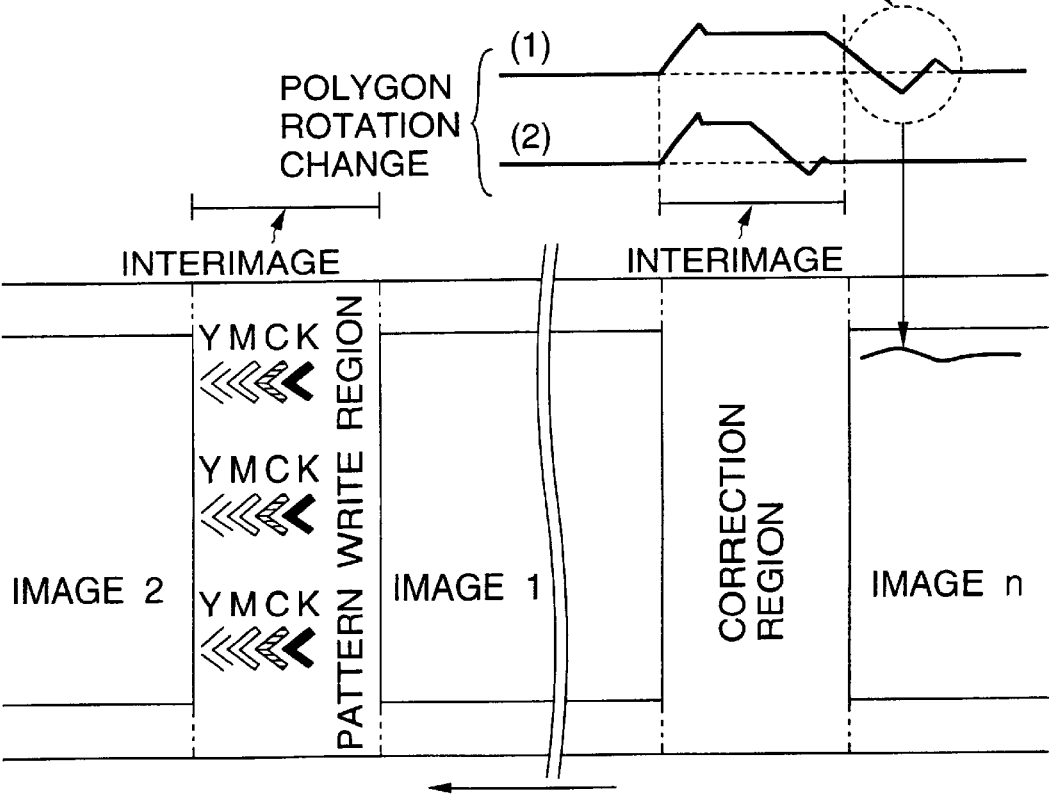
Figure 18A:
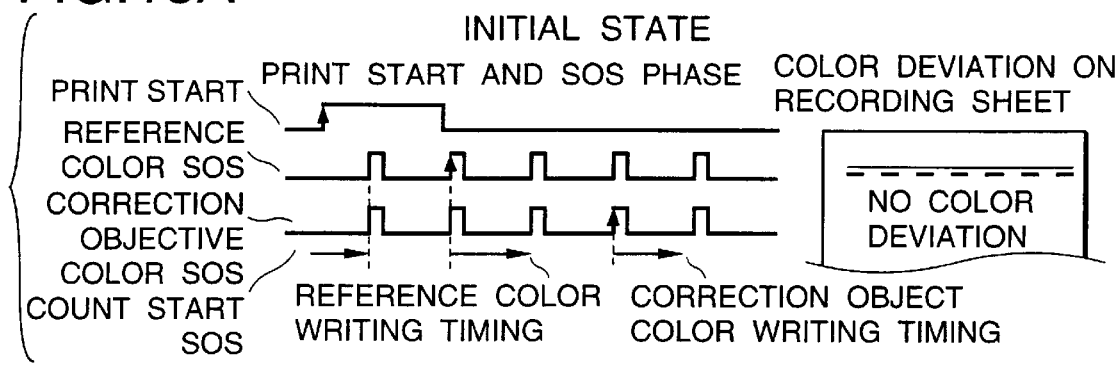
FIGS. 18A to 18E are views for explaining color deviation correction by phase control of a polygon mirror, and a cause of color deviation enlargement, FIG. 18A showing an initial state, FIG. 18B showing a state before the color deviation correction, FIG. 18C showing a state after the color deviation correction, FIG. 18D showing a state before the second color deviation correction, and FIG. 18E showing a state after the second color deviation correction.
Figure 18B:
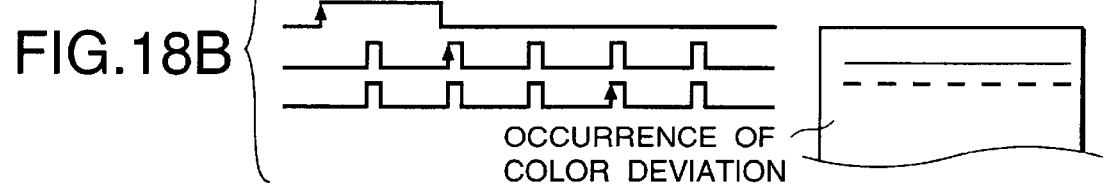
Figure 18C:
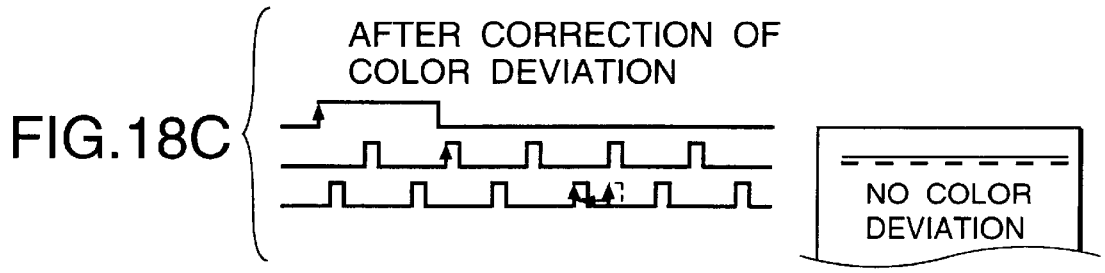
Figure 18D:
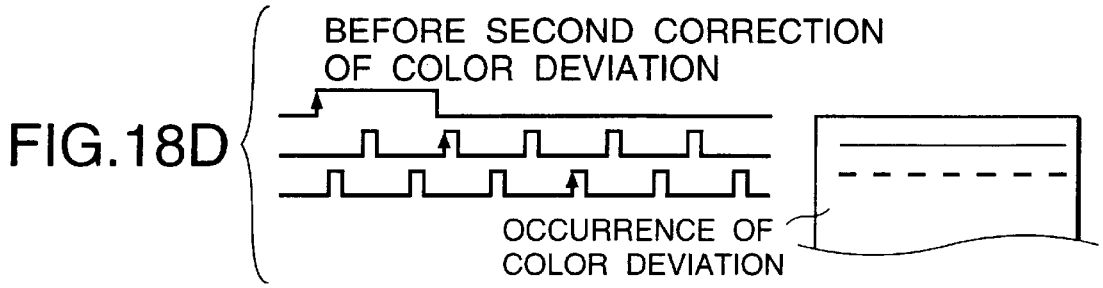
Figure 18E:
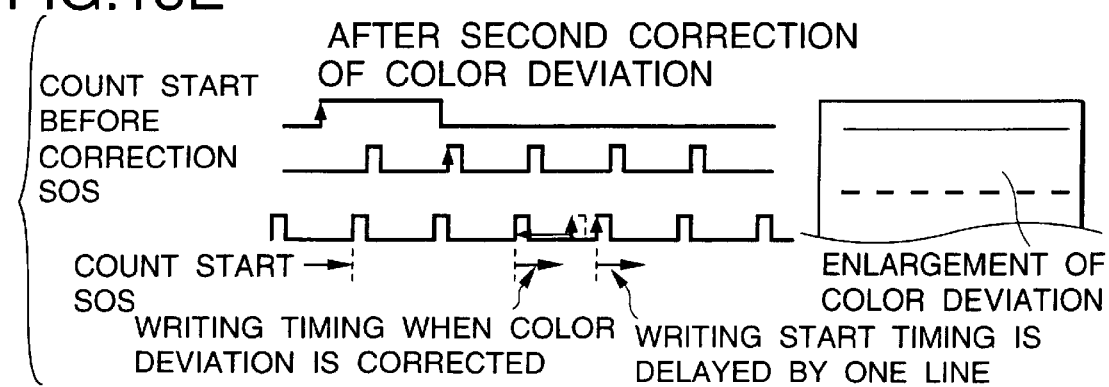

It is preferable that the execution of correction is made at the timing, among plural interimage periods, when a pattern image, such as a color registration deviation detection pattern or a density detection pattern, is not written, for example, in the interimage period when a seam (joint) portion of the intermediate transfer body (intermediate transfer belt) 34 appears as shown in FIG. 11B.

Figure 9:
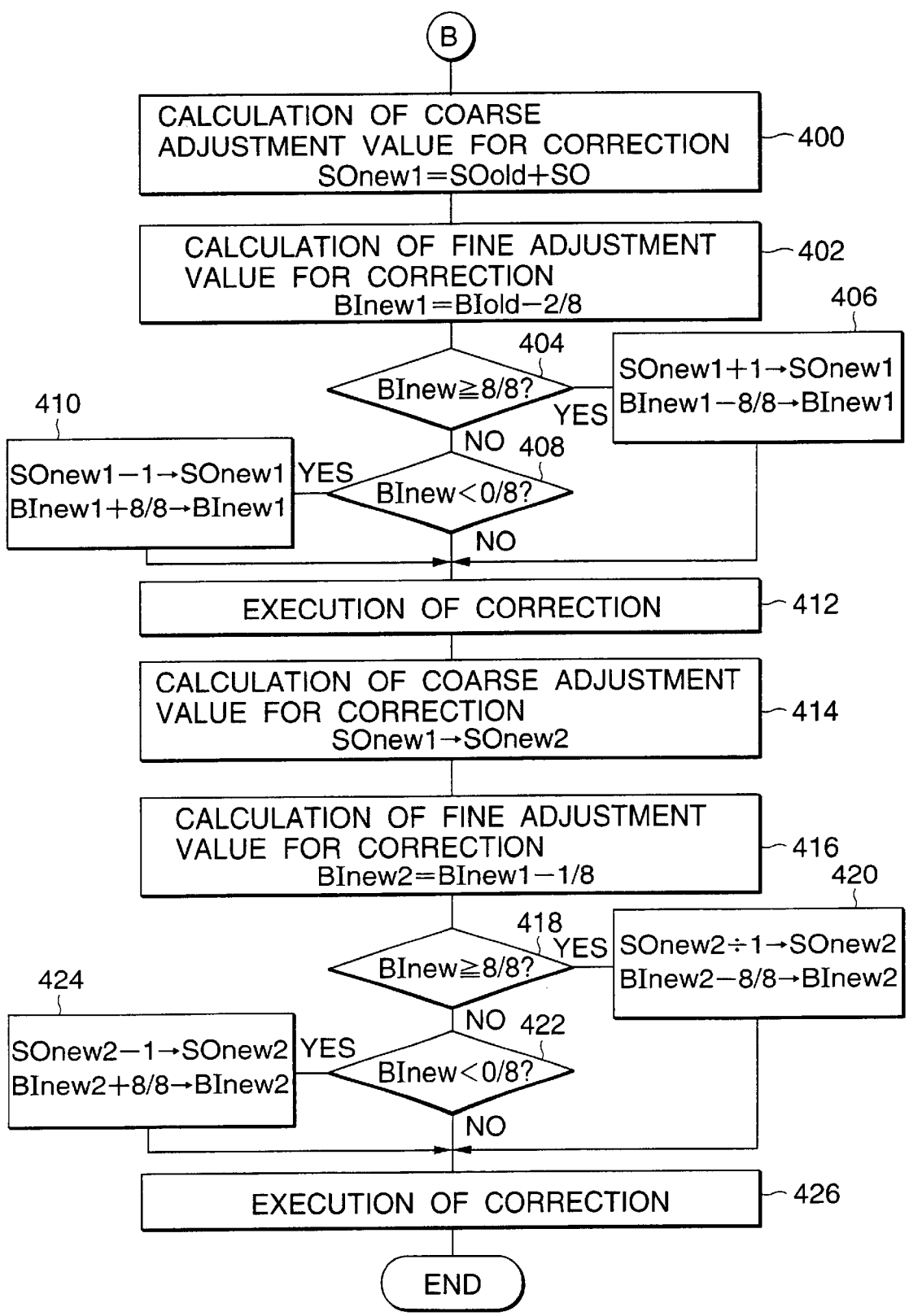
FIG. 9 is a flowchart showing a coupling point B of the flowchart for explaining the color registration deviation correction.

Next, the flowchart B shown in FIG. 9 will be described.

In the case where the judgement at step 216 (see FIG. 7) is affirmative, since the fine adjustment amount (BI) is −3/8, it is necessary to make corrections twice.

Then, at step 400, a coarse adjustment value for correction (SOnew1) is calculated. The coarse adjustment value for correction (SOnew1) is calculated by adding the previous coarse adjustment value for correction (SOold) and the coarse adjustment amount (SO). The coarse adjustment value for correction is calculated from a count value of the SOS signal from the SOS count start timing.

At step 402, a fine adjustment value for correction (BInew1) is calculated. The fine adjustment value for correction (BInew1) is calculated by subtracting 2/8 from the previous fine adjustment value for correction (BIold) so that In the case where the judgement at step 404 is negative, the procedure proceeds to step 408, and it is judged whether the fine adjustment value for correction (BInew1) calculated at step 402 is smaller than 0/8. In the case where the judgement is affirmative, the procedure proceeds to step 410.

At step 410, a value obtained by subtracting 1 from the coarse adjustment value for correction (SOnew1) is made the coarse adjustment value for correction (SOnew1), a value obtained by adding 8/8 to the fine adjustment value for correction (BInew1) as the absolute phase after the calculation is made the fine adjustment value for correction (BInew1), and the procedure proceeds to step 412. That is, similarly to step 406, it is possible to prevent write deviation of one line part from occurring by the change of the count start timing of the SOS signal with the image start signal as the trigger.

On the other hand, in the case where the judgement at step 408 is negative, the procedure proceeds to step 412.

At step 412, the first correction is executed. For example, in the case where the absolute phase before the correction is 3/8, the absolute phase after the correction becomes (3/8)−(2/8)=1/8. While the fine adjustment amount (BI) before the correction is −3/8 line part, −2/8 line part is corrected, so that the color registration deviation becomes less and printing is made.

Subsequently, at step 414, a coarse adjustment value for correction (SOnew2) in regard to the second correction is calculated. Incidentally, as to the coarse adjustment value for correction (SOnew2), the coarse adjustment value for correction (SOnew1) calculated at step 400 is replaced with the coarse adjustment value for correction (SOnew2).

At step 416, a fine adjustment value for correction (BInew2) in regard to the second correction is calculated. That is, the part (−1/8 line part) remaining after the first correction is added.

Subsequently, at step 418, it is judged whether the fine adjustment value for correction (BInew2) calculated at step 416 is equal to or larger than 8/8. In the case where the judgement is affirmative, the procedure proceeds to step 420.

At step 420, a value obtained by adding 1 to the coarse adjustment value for correction (SOnew2) is made the coarse adjustment value for correction (SOnew2), a value obtained by subtracting 8/8 from the fine adjustment value for correction (BInew2) as the absolute phase after the calculation is made the fine adjustment value for correction (BInew2), and the procedure proceeds to step 426. That is, according to the correction made in the previous interimage period, there is a case where the count start timing of the SOS signal with the image start signal as the trigger is deviated by the correction in the next interimage period. Thus, the coarse adjustment value for correction and the fine adjustment value for correction are again corrected on the basis of the value of the correction made in the previous interimage period. Accordingly, it is possible to prevent write deviation of one line part from occurring by the change of the count start signal of the SOS signal with the image start signal as the trigger.

Besides, in the case where the judgement at step 418 is negative, the procedure proceeds to step 422, and it is judged whether the fine adjustment value for correction (BInew2) calculated at step 416 is smaller than 0/8. In the case where the judgement is affirmative, the procedure proceeds to step 424.

At step 424, a value obtained by subtracting 1 from the coarse adjustment value for correction (SOnew2) is made the coarse adjustment value for correction (SOnew2), and a value obtained by adding 8/8 to the fine adjustment value for correction (BInew2) as the absolute phase after the calculation is made the fine adjustment value for correction (BInew2), and the procedure proceeds to step 426. That is, similarly to step 420, it is possible to prevent write deviation from occurring by the change of the count start timing of the SOS signal with the image start signal as the trigger.

On the other hand, in the case where the judgement at step 422 is negative, the procedure proceeds to step 426.

At step 426, the second correction is executed. In the second correction, the correction of −1/8 line part as the deviation amount remaining after the first correction is made. That is, the absolute phase after the second correction becomes 1/8−1/8=0/8. Thus, the total fine adjustment amount in the first correction and the second correction becomes (−2/8)+(−1/8)=−3/8, and all of the detected deviation amount can be corrected.

It is preferable that the execution of both the first correction and the second correction is made at the timing, among plural interimage periods, when the color registration deviation detection pattern image or the density detection pattern is not written, for example, in the interimage period when the seam (joint) portion of the intermediate transfer body (intermediate transfer belt) 34 appears as shown in FIG. 11B.

Figure 10:
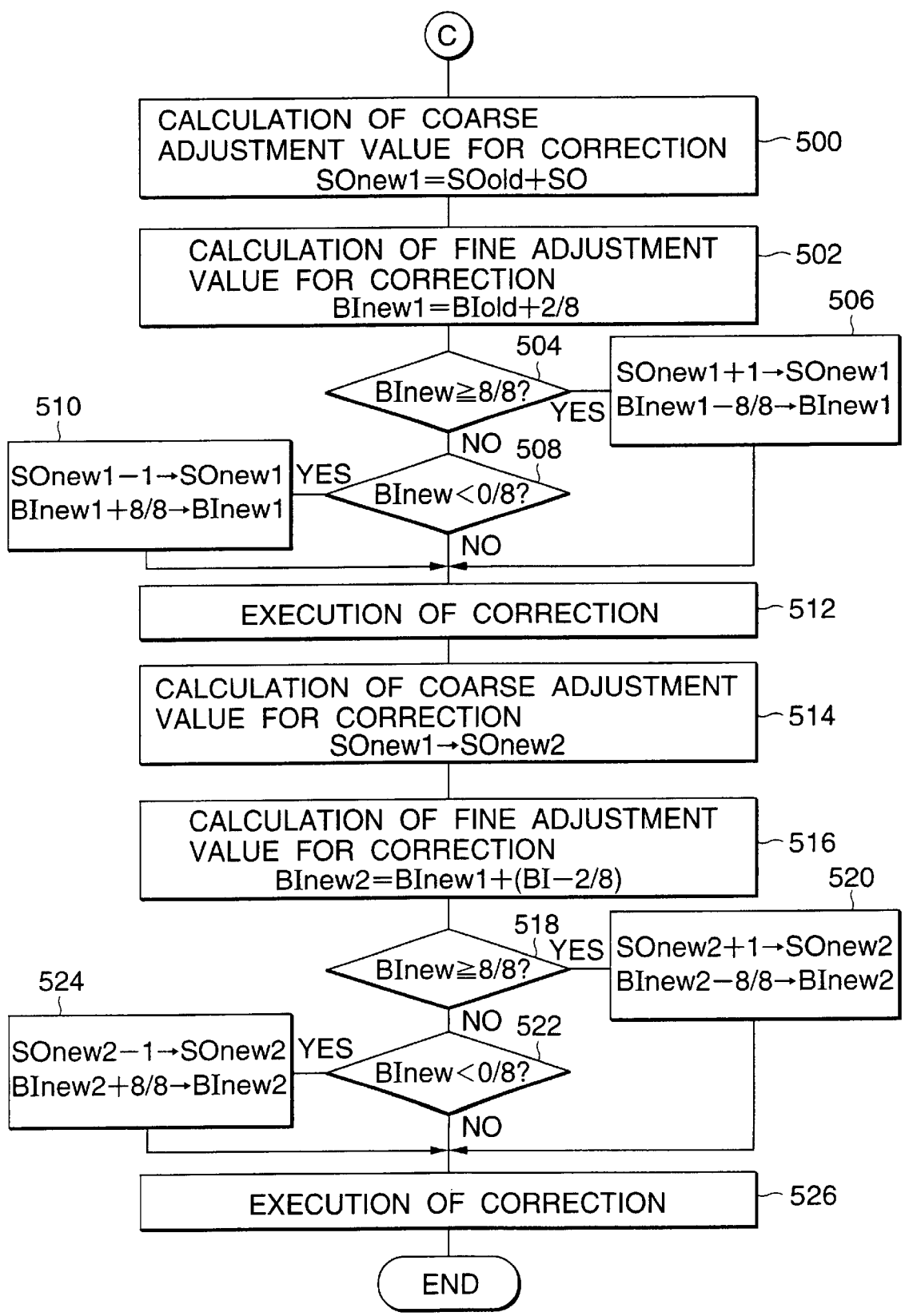
FIG. 10 is a flowchart showing a coupling point C of the flowchart for explaining the color registration deviation correction.

Finally, the flowchart C of FIG. 10 will be described.

In the case where the judgement at step 216 (see FIG. 7) is negative, since the fine adjustment amount (BI) is +3/8 or +4/8, it is necessary to make corrections twice.

At step 500, a coarse adjustment value for correction (SOnew1) is calculated. The coarse adjustment value for correction (SOnew1) is calculated by adding the previous coarse adjustment value for correction (SOold) and the coarse adjustment amount (SO). The coarse adjustment value for correction is calculated from a count value of the SOS signal from the SOS count start timing.

At step 502, a fine adjustment value for correction (BInew1) is calculated. The fine adjustment value for correction (BInew1) is calculated by adding 2/8 to the previous fine adjustment value for correction (BIold) so that only +2/8 line part is corrected among the fine adjustment amount 3/8 or 4/8 line part.

Subsequently, at step 504, it is judged whether the fine adjustment value for correction (sum of the absolute phase before the calculation and the fine adjustment amount) calculated at step 502 is equal to or larger than 8/8. In the case where the judgement is affirmative, the procedure proceeds to step 506.

At step 506, a value obtained by adding 1 to the coarse adjustment value for correction is made the coarse adjustment value for correction (SOnew1), and a value obtained by subtracting 8/8 from the fine adjustment value for correction (BInew1) as the absolute phase after the calculation is made the fine adjustment value for correction (BInew1), and the procedure proceeds to step 512. That is, according to the correction made in the previous interimage period, there is a case where the count start timing of the SOS signal with the image start signal as the trigger is deviated by the correction in the next interimage period. Thus, the coarse adjustment value for correction and the fine adjustment value for correction are again corrected on the basis of the value of the correction made in the previous interimage period. Accordingly, it is possible to prevent write deviation of one line part from occurring by the change of the count start timing of the SOS signal with the image start signal as the trigger.

In the case where the judgement at step 504 is negative, the procedure proceeds to step 508, and it is judged whether the fine adjustment value for correction (BInew1) calculated at step 502 is smaller than 0/8. In the case where the judgement is affirmative, the procedure proceeds to step 510.

At step 510, a value obtained by subtracting 1 from the coarse adjustment value for correction (SOnew1) is made the coarse adjustment value for correction (SOnew1), a value obtained by adding 8/8 to the fine adjustment value for correction (BInew1) as the absolute phase after the calculation is made the fine adjustment value for correction (BInew1), and the procedure proceeds to step 512. That is, similarly to step 506, it is possible to prevent write deviation of one line part from occurring by the change of the count start timing of the SOS signal with the image start signal as the trigger.

On the other hand, in the case where the judgement at step 508 is negative, the procedure proceeds to step 512.

At step 512, the first correction is executed. For example, in the case where the absolute phase before the correction is 4/8, the absolute phase after the correction becomes (4/8)+

(2/8)=6/8. While the fine adjustment amount (BI) before the correction is 4/8 line part, 2/8 line part is corrected, so that the color registration deviation becomes less and printing is made.

Subsequently, at step 514, a coarse adjustment value for correction (SOnew2) in regard to the second correction is calculated. With respect to the coarse adjustment value for correction (SOnew2), the coarse adjustment value for correction (SOnew1) calculated at step 500 is replaced with the coarse adjustment value for correction (SOnew2).

At step 516, a fine adjustment value for correction (BInew2) in regard to the second correction is calculated. That is, the part (BI−2/8 line part) remaining after the first correction is added to the fine adjustment value for correction (BInew1).

Subsequently, at step 518, it is judged whether the fine adjustment value for correction (BInew2) calculated at step 516 is equal to or larger than 8/8. In the case where the judgement is affirmative, the procedure proceeds to step 520.

At step 520, a value obtained by adding 1 to the coarse adjustment value for correction (SOnew2) is made the coarse adjustment value for correction (SOnew2), a value obtained by subtracting 8/8 from the fine adjustment value for correction (BInew2) as the absolute value after the calculation is made the fine adjustment value for correction (BInew2), and the procedure proceeds to step 526. That is, according to the correction made in the previous interimage period, there is a case where the count start timing of the SOS signal with the image start signal as the trigger is deviated by the correction in the next interimage period. Thus, the coarse adjustment value for correction and the fine adjustment value for correction are again corrected on the basis of the value of the correction made in the previous interimage period. Accordingly, it is possible to prevent write deviation of one line part from occurring by the change of the count start timing of the SOS signal with the image start signal as the trigger.

In the case where the judgement at step 518 is negative, the procedure proceeds to step 522, and it is judged whether the fine adjustment value for correction (BInew2) calculated at step 516 is smaller than 0/8. In the case where the judgement is affirmative, the procedure proceeds to step 524.

At step 524, a value obtained by subtracting 1 from the coarse adjustment value for correction (SOnew2) is made the coarse adjustment value for correction (SOnew2), a value obtained by adding 8/8 to the fine adjustment value for correction (BInew2) as the absolute phase after the calculation is made the fine adjustment value for correction (BInew2), and the procedure proceeds to step 526. That is, similarly to step 520, it is possible to prevent write deviation of one line part from occurring by the change of the count start timing of the SOS signal with the image start signal as the trigger.

On the other hand, in the case where the judgement at step 522 is negative, the procedure proceeds to step 526.

At step 526, the second correction is executed. In the second correction, the correction of the deviation amount (+1/8 when BI is 3/8 line part, +2/8 when BI is 4/8 line part) remaining after the first correction is made. That is, when the fine adjustment amount (BI) is 3/8 line part, it becomes +2/8 (first correction)+1/8(second correction)=3/8, and when the fine adjustment amount (BI) is 4/8 line part, it becomes +2/8 (first correction)+2/8 (second correction)=4/8. Thus, all of the detected deviation amount can be corrected by the first correction and the second correction. Table 3 shows the calculation of the coarse adjustment value for correction and the fine adjustment value for correction in the case where the fine adjustment amount is −3/8, +3/8, and +4/8 line part.

TABLE 3

| | | fine adjustment amount | | | | | | | |
|---|---|---|---|---|---|---|---|---|---|
| | | −3/8 | | | +3/8 | | | +4/8 | |
| First correction | | | | | | | | | |
| calculation | absolute phase before calculation −2/8 | | | absolute phase before calculation −2/8 | | | absolute phase before calculation +2/8 | | |
| absolute phase after calculation | when it is not smaller than 8/8 | when it is smaller than 0/8 | the rest | when it is not smaller than 8/8 | when it is smaller than 0/8 | the rest | when it is not smaller than 8/8 | when it is smaller than 0/8 | the rest |
| fine adjustment recalculation | −8/8 | −8/8 | — | −8/8 | +8/8 | — | −8/8 | +8/8 | — |
| coarse adjustment change value | +1 | −1 | 0 | +1 | −1 | 0 | +1 | −1 | 0 |
| Second correction | | | | | | | | | |
| calculation | absolute phase after first correction −1/8 | | | absolute phase after first correction +1/8 | | | absolute phase after first correction +2/8 | | |
| absolute phase after calculation | when it is not smaller than 8/8 | when it is smaller than 0/8 | the rest | when it is not smaller than 8/8 | when it is smaller than 0/8 | the rest | when it is not smaller than 8/8 | when it is smaller than 0/8 | the rest |
| fine adjustment recalculation | −8/8 | +8/8 | — | −8/8 | +8/8 | — | −8/8 | +8/8 | — |

TABLE 3-continued

|  | \multicolumn{3}{c}{fine adjustment amount} | | | | | | |
| --- | --- | --- | --- | --- | --- | --- | --- | --- |
|  | \multicolumn{3}{c}{−3/8} | \multicolumn{3}{c}{+3/8} | \multicolumn{3}{c}{+4/8} |
| coarse adjustment change value | +1 | −1 | 0 | +1 | −1 | 0 | +1 | −1 | 0 |

Incidentally, it is preferable that the execution of both the first correction and the second correction is made at the timing, among plural interimage periods, when the color registration deviation detection pattern image, the density detection pattern, or the like is not written, for example, in the interimage period when the seam (joint) portion of the intermediate transfer body (intermediate transfer belt) 34 appears as shown in FIG. 11B.

Like this, in this embodiment, in the case where the detected deviation amount (BI) can not be corrected in one interimage period, corrections are made twice at the maximum, so that the color registration deviation in sub-scanning can be eliminated.

Besides, in the case where correction can not be made in one interimage period, the correction is made in plural (in this embodiment, two) interimage periods. Thus, it is possible to prevent such a case that printing is made on a next sheet before the rotation of the polygon mirror driving motor 100Y (100M, 100C, or 100K) is stabilized so that the influence of the rotation change of the polygon mirror driving motor 100Y (100M, 100C, or 100K) appears on the image.

Incidentally, in this embodiment, as described above, the minimum unit of the writing position correction of less than one line in sub-scanning is made 1/8 line part, it is assumed that the range where its correction time falls within an interimage period is between ±2/8 line, and the rotation phase range of the actually rotating polygon mirror 20Y (20M, 20C, or 20K) is in the range of from −3/8 to 4/8. However, the range where the correction time falls within the interimage period may be further widened or may be narrowed. Besides, the minimum unit of the writing position correction may be made further fine or may be made coarse.

Besides, even in the case where a writing clock frequency in the main scanning direction is adjusted in an interimage period to correct the magnification of the main scanning, when a certain time is required for frequency stabilization at the time of frequency change, the present invention can be applied.

Further, in this embodiment, although the description has been made on the example of the multicolor image forming apparatus 10 including four developing units 12Y, 12M, 12C and 12K, the present invention can be sufficiently applied to an image forming apparatus including one, two, or three image forming units.

Incidentally, in this embodiment, the description has been made on the example in which in the case where a time for correction of a color registration deviation correction amount falls in a predetermined time, the color registration deviation is corrected in the predetermined time, and in the case where it does not fall in the predetermined time, the color registration deviation correction is made plural times. However, the color registration deviation correction may be always made plural times without judging whether the time for correction falls in the predetermined time. In that case, there is a merit that the control becomes simple.

As described above, according to the present invention, the color registration deviation correction is made plural times, so that there are effects that a period required for the color registration deviation correction does not overlap with image formation and the color registration deviation can be certainly corrected without exerting a bad influence on the image.

Thus, it is possible to provide the color registration deviation correction method and the image forming apparatus in which an image can be formed at high speed while the high quality image is kept and the color registration can be controlled without interrupting the image formation.

What is claimed is:

1. A color registration deviation correction method of an image forming apparatus for forming an image by light scanning of a rotating polygon mirror reflecting and deflecting light from a light source, the color registration deviation correction method comprising the steps of:

detecting a color registration deviation;

calculating, from the detected color registration deviation, at least first and second correction values for making a correction of the color registration deviation; and implementing the at least first and second calculated correction values to make the color registration deviation correction among plural time periods.

2. A color registration deviation correction method according to claim 1, wherein the color registration deviation correction is made in a region outside of a range of an image region where the image is formed.

3. A color registration deviation correction method of an image forming apparatus for forming an image by light scanning of a rotating polygon mirror reflecting and deflecting light from a light source, the color registration deviation correction method comprising:

a first step of detecting a color registration deviation and calculating, from the detected color registration deviation, a correction value for making a correction of the color registration deviation;

a second step of judging, on the basis of the correction value calculated at the first step, whether a time needed to make the color registration deviation correction is longer than a predetermined period; and a third step of, when it is judged that the time needed is shorter than the predetermined period at the second step, correcting the color registration deviation in the predetermined period and, when it is judged that the time needed is longer than the predetermined period at the second step, dividing the color registration deviation correction into plural parts, a time needed for each part being shorter than the predetermined period, and making the correction of each of the plural parts.

4. A color registration deviation correction method according to claim 3, wherein the predetermined period is a time corresponding to a gap in a range of an image region where the image is formed.

5. A color registration deviation correction method according to claim 1, wherein when the color registration deviation correction is made plural times, a correction amount of the color registration deviation is lessened each time the correction is made.

6. A color registration deviation correction method according to claim 1, wherein in the color registration deviation correction, at least one of a writing position deviation correction in a sub-scanning direction and an image magnification correction in a main scanning direction is made.

7. A color registration deviation correction method according to claim 6, wherein the writing position deviation correction in the sub-scanning direction is made by controlling at least a rotation phase of the rotating polygon mirror.

8. A color registration deviation correction method according to claim 6, wherein the image magnification correction in the main scanning direction is made by controlling a clock frequency used at image formation.

9. A color registration deviation correction method according to claim 7, wherein when the writing position in the sub-scanning direction is corrected by controlling the rotation phase of the rotating polygon mirror, in a case where it is judged that an image writing start surface of the rotating polygon mirror moves to an adjacent surface by control of the rotation phase, a writing timing is changed in advance.

10. A color registration deviation correction method according to claim 1, wherein the color registration deviation correction is made in a specified period except for at least a period when the color registration deviation is detected.

11. An image forming apparatus for forming an image by light scanning of a rotating polygon mirror reflecting and deflecting light from a light source, the image forming apparatus comprising:

a detection unit which detects a color registration deviation;

a calculation unit which, from the color registration deviation detected by the detection unit, calculates a correction value for correcting the color registration deviation; and a control unit which divides the correction value calculated by the calculation unit and causes the color registration deviation correction to be made plural times using the divided values.

12. An image forming apparatus according to claim 11, wherein the color registration deviation correction is made in a region outside of a range of an image region where the image is formed.

13. An image forming apparatus for forming an image by light scanning of a rotating polygon mirror reflecting and deflecting light from a light source, the image forming apparatus comprising:

a detection unit which detects a color registration deviation;

a calculation unit which calculates, from the color registration deviation detected by the detection unit, a correction value for correcting the color registration deviation; and a control unit which causes the color registration deviation to be corrected in a predetermined period when a time need to make a correction of the color registration deviation on the basis of the correction value calculated by the calculation unit is shorter than the predetermined period, and causes the color registration deviation correction to be made plural times when the time is longer than the predetermined period.

14. An image forming apparatus according to claim 13, wherein the predetermined period is a time corresponding to a gap in a range of an image region where the image is formed.

* * * * *